US006969204B2

(12) United States Patent
Kilian

(10) Patent No.: US 6,969,204 B2
(45) Date of Patent: Nov. 29, 2005

(54) OPTICAL PACKAGE WITH AN INTEGRATED LENS AND OPTICAL ASSEMBLIES INCORPORATING THE PACKAGE

(75) Inventor: Arnd Kilian, Berlin (DE)

(73) Assignee: Hymite A/S, Lyngby (DK)

( * ) Notice: Subject to any disclaimer, the term of this patent is extended or adjusted under 35 U.S.C. 154(b) by 138 days.

(21) Appl. No.: 10/305,255

(22) Filed: Nov. 26, 2002

(65) Prior Publication Data

US 2004/0101259 A1 May 27, 2004

(51) Int. Cl.[7] .......... G02B 6/42
(52) U.S. Cl. .......... 385/93; 385/88; 385/92; 385/94
(58) Field of Search .......... 385/88–94

(56) References Cited

U.S. PATENT DOCUMENTS 4,826,272 A * 5/1989 Pimpinella et al. .......... 385/92
4,897,711 A * 1/1990 Blonder et al. .......... 257/48
5,127,075 A 6/1992 Althaus et al.
5,577,142 A * 11/1996 Mueller-Fiedler et al. .... 385/47
5,696,862 A 12/1997 Hauer et al.
5,814,870 A 9/1998 Spaeth .......... 257/433
5,821,530 A * 10/1998 Lefevre et al. .......... 250/227.24
6,036,872 A 3/2000 Wood et al.
6,208,783 B1 * 3/2001 Wach .......... 385/43
6,422,766 B1 7/2002 Althaus et al.
6,547,455 B1 * 4/2003 Hashizume .......... 385/93
6,550,982 B2 * 4/2003 Auburger et al. .......... 385/88
2003/0071283 A1 4/2003 Heschel
2003/0152336 A1 * 8/2003 Gurevich et al. .......... 385/88

FOREIGN PATENT DOCUMENTS

| | | |
|---|---|---|
| DE | 19616969 A1 | 10/1997 |
| EP | 0 331 331 A2 | 9/1989 |
| EP | 0 599 212 A1 | 6/1994 |
| GB | 2312551 A | 10/1997 |
| WO | WO 96/00920 | 1/1996 |
| WO | 97/04491 | 2/1997 |
| WO | 01/01497 | 1/2001 |

* cited by examiner

*Primary Examiner*—Akm Enayet Ullah
*Assistant Examiner*—Kevin S. Wood
(74) *Attorney, Agent, or Firm*—Fish & Richardson P.C.

(57) ABSTRACT

Packages that include an integrated lens to help collimate light emitted by or to be received by an optoelectronic device encapsulated within the package are disclosed. The packages may be incorporated into larger optical assemblies.

35 Claims, 12 Drawing Sheets

OPTICAL PACKAGE WITH AN INTEGRATED LENS AND OPTICAL ASSEMBLIES INCORPORATING THE PACKAGE

BACKGROUND

The disclosure relates to optical packages with an integrated lens and optical assemblies incorporating such a package.

An optical package may include one or more optical, optoelectronic and electronic components. Proper packaging of the components is important to ensure the integrity of the signals and often determines the overall cost of the optical assembly. Precise accuracy typically is required to align an optical signal, for example, from a semiconductor laser housed by the package, with an optical fiber. However, precise alignment alone may be insufficient to couple the light into the optical fiber, for example, if the light from the laser diverges significantly.

SUMMARY

Various packages that include an integrated lens that may help collimate light emitted by or to be received by an optoelectronic device encapsulated within the package are disclosed. The packages may be incorporated into larger optical assemblies.

For example, according to one aspect, a package includes a cap with a recess. An opto-electronic device for emitting or receiving light is mounted within the recess, and a base is attached to the cap to define an encapsulated region in an area of the recess. The base is transparent to a wavelength of light which the opto-electronic device is designed to emit or receive. A lens is integrated with the package for at least partially collimating light traveling to or from the opto-electronic device.

In some implementations, the lens may be a surface-machined micro-lens formed integrally with the base. The lens may consist, for example, of a spherical protrusion from the base.

According to another aspect, a package includes a cap with a recess. An opto-electronic device for emitting or receiving light is mounted within the recess. The package also includes a base that is transparent to a wavelength of light which the opto-electronic device is designed to emit or receive. In addition, a plate that holds a lens for at least partially collimating a light beam is disposed between the cap and the base. The recess includes a sidewall with a reflective surface to form part of a path for a light beam traveling between the opto-electronic device and the lens.

The plate may include, for example, a pyramid-shaped groove to hold the lens A ball lens may suitable as the lens in some implementations.

The opto-electronic device encapsulated within the package may include a light receiving device or a light emitting device, such as a surface emitting semiconductor laser or an edge emitting light semiconductor laser. Thus, a light beam emitted by the light emitting device passes through the lens before exiting the package.

In some implementations, the recess in the cap may include a sidewall with a reflective coating on its surface to redirect light from the opto-electronic device toward the lens.

The opto-electronic device may be hermetically sealed within the package.

The packages may be incorporated into an optical assembly so that light to or from the opto-electronic device within the package may be coupled to an optical fiber. Details of example of such assemblies are described below.

In various implementations, one or more of the following advantages may be present. The integrated lens encapsulated within the package may partially or substantially collimate the light beam from the light emitting device in the package so that the light beam is emitted from the package at a low divergence angle, with the base serving as a transparent window for the emitted light.

Other advantages may include the ability to make an optical package having relatively small dimensions and well-adapted to surface mounting technologies. In some cases, the relative alignment tolerances of the optical package and the optical fiber holder assembly may be relaxed because of the magnified mode fields. As a result, the assembly sequence of circuit boards that include one or more opto-electronic devices may be adapted more easily to modem surface mounting technologies.

Use of such packages may permit electrical lines to be shortened and feed-through lines to be made small so that the transmission of high-frequency signals from the outside into the package and vice-versa can be improved. A hermetically sealed package can enhance the reliability and lifetime of the opto-electronic components housed within the package.

Other features and advantages will be readily apparent from the following detailed description, the accompanying drawings and the claims.

DETAILED DESCRIPTION

Various examples of hermetically sealed packages with an integrated lens to help collimate light emitted by or to be received by an optoelectronic device encapsulated by the package are described below. The packages may be incorporated into larger optical assemblies.

Figure 1:
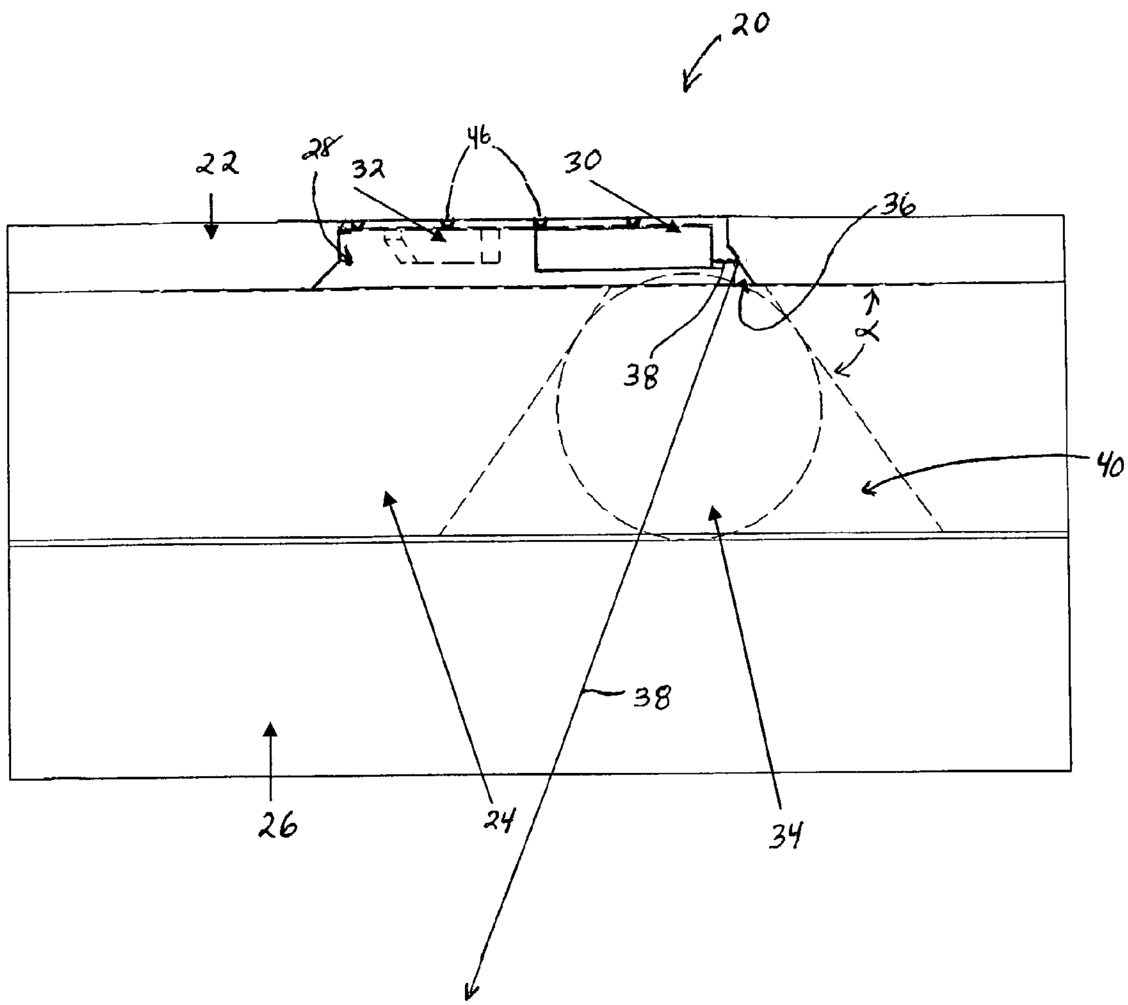
FIG. 1 illustrates a cross-sectional view of an optical package with an integrated lens according to a first implementation.

As shown in FIG. 1, a package 20 includes a cap 22, a high index ball lens 34 held in place by a plate 24, and a base 26. The cap 22 includes a recess 28 on its underside. The cap 22 may comprise, for example, a semiconductor material such as silicon, which allows the recess 28 to be formed by standard etching processes. A dry etching technique may be used to form the substantially vertical straight portions of the sidewalls, whereas a wet etching technique may be used to form the slanting portion of the sidewalls. In the implementation of FIG. 1, a standard [100] silicon wafer may be used, resulting in an angle α of about 54.7° for the slanted portions of the sidewalls. The angle of the sidewalls may differ in other implementations.

Figures 2, 3:
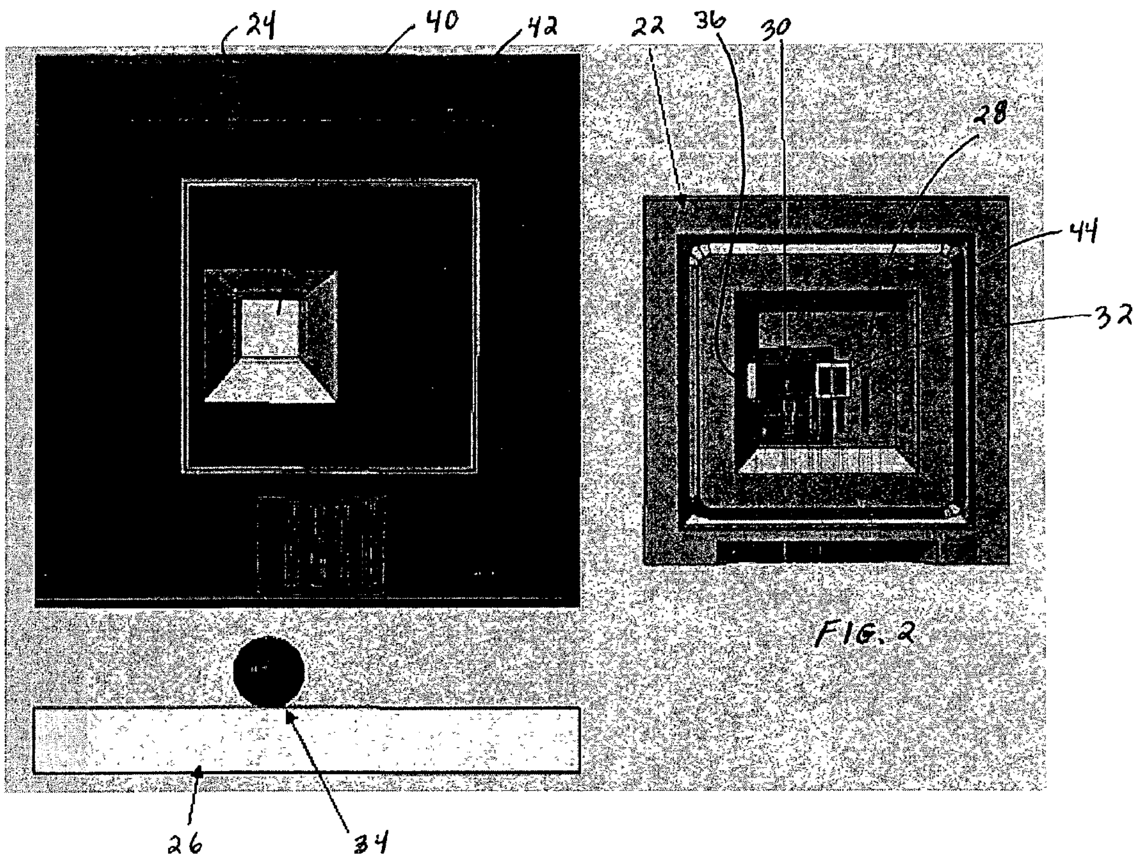
FIG. 2 illustrates the cap in the optical package of FIG. 1.
FIG. 3 illustrates a lens holder plate and base in the optical package of FIG. 1.

One or more optoelectronic components may be mounted in the recess, for example, by soldering them onto metallic pads previously deposited at the bottom of the recess. As shown in FIGS. 1 and 2, an edge-emitting semiconductor laser 30 and a monitor diode 32 are mounted within the recess of the cap 22. A high precision pick and place machine, such as an opto-bonder, may be used to position the opto-electronic devices.

The edge-emitting device 30 may be mounted either with its active side up or down. Mounting the device with its active side down, however, may provide better control of the lateral position of the light emitting region. Furthermore, in high frequency applications, contacts to the device 30 may be made from the front side of the device so as to avoid the use of bond wires. Also, in high power applications, heat flow from the active region can be improved by mounting the device, with its active side down, on a diamond submount or another heat spreader. To prevent partial blocking of the laser's diverging output beam when the laser is mounted with its active side down, a mechanical support to raise the position of the laser within the recess may be added. A thick solder layer or solder bumps may be used, for example, to provide such support.

In some cases, bond wires or other electrical connections may be provided to couple the laser and monitor diode to metallization contacts. Hermetically sealed feed-through connections 46 may be used to couple the metallization within the recess 28 to electrical contacts on the outside of the package.

Various techniques may be used to form the hermetically sealed through-hole connections 46. One such technique uses a multilayer structure that includes a substantially etch-resistant layer sandwiched between first and second semiconductor layers. The first and second semiconductor layers may include, for example, silicon, and the etch-resistant layer may include, for example, silicon nitride, silicon oxy-nitride or silicon dioxide. The through-holes may be formed using a double-sided etching process in which the first and second layers are etched until the etch-resistant layer is exposed to define the locations of the through-holes. The semiconductor layer that is intended to be on the underside of the cap 22 may be etched over an area that corresponds to the positions of all or a large number of the through-holes. The through-holes then may be formed by removing part of the etch-resistant layer.

The through-holes may be hermetically sealed, for example, using an electro-plated feed-through metallization process as the base for the through-hole connections. The feed-through metallization also may include a diffusion barrier, and the sealing material may include, for example, a non-noble metal.

As shown in FIG. 1, a portion of the recess' slanted sidewall adjacent the optical output of the laser 30 is coated with a reflective material such as metal, which acts as a reflecting surface 36 to redirect light 38 from the laser toward the lens 34. In one particular implementation, the lens 34 comprises sapphire. By incorporating the straight vertical portions of the sidewalls, the laser 30 can be moved closer to the reflective surface 36.

The lens holder plate 24, which may comprise, for example, silicon, includes a through-hole such as a pyramid or other suitably shaped groove 40 (see FIG. 3) to hold the lens 34 in place. The groove may be formed, for example, by a standard wet etching process. The base 26 should comprise a material, such as silicon or glass, that is well-matched to thermal expansion of the lens holder plate 24 and that is transparent to the wavelength of light emitted by the laser 30. Thus, if opto-electronic devices operating at a wavelength below the transparency limit of silicon are encapsulated in the package, the base may be made, for example, of a suitable glass.

The lens 34, the lens holder plate 24 and the base 26 may be assembled as follows. First, the lens holder plate may be positioned such that the end of the groove 40 having the smaller diameter faces downward. The ball lens 34 then would be inserted in the groove. Next, the base is placed over the lens holder plate. A glass solder ring 42 (FIG. 3) may be used to form a hermetic seal between the lens holder plate 24 and the base 26. Similarly, a metal solder ring 44 (FIG. 2) may be used to form a hermetic seal when the cap 22 is attached to the lens holder plate 24.

Alternatively, the lens holder plate 24 can be fixed on the cap 22 first. Then the ball lens 34 may be inserted, and, if necessary, actively aligned and attached in the groove using a thin layer of adhesive previously deposited on the side wall of the groove. Next, the base may be placed on top and sealed, for example, with a low melting point metal solder ring 42.

In the implementation of FIG. 1, once the cap 22, the lens holder plate 24 and the base 26 are assembled together, a hermetically sealed package results. The lens 34 can substantially collimate the light from the laser 30 so that the package 20 emits the light beam at a low divergence angle, with the base 26 serving as a transparent window for the emitted light.

One advantage of the foregoing implementation may include the relative ease with which the slanted sidewalls of the recess may be formed using standard semiconductor etching techniques. Although the laser light is not reflected by the metal surface 36 at a ninety-degree angle, the use of the ball lens 34 can accommodate such an angle.

Figure 4:
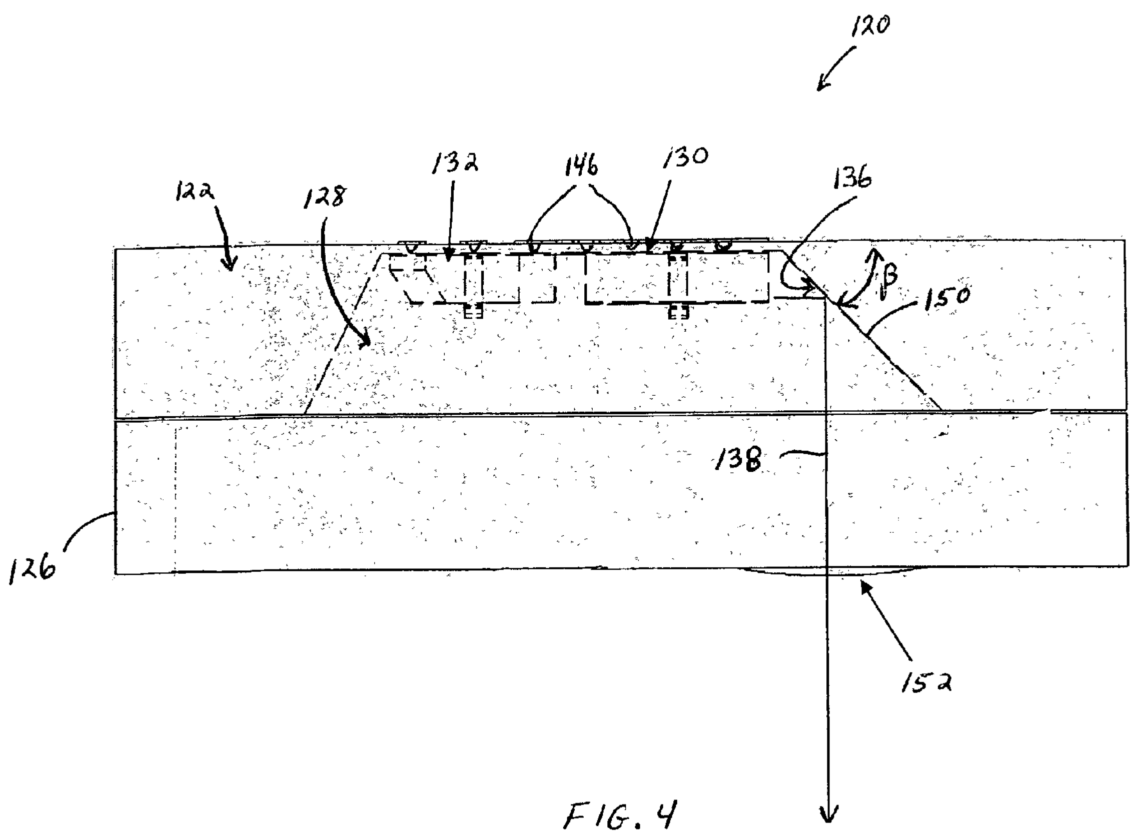
FIG. 4 illustrates a cross-sectional view of an optical package with an integrated lens according to a second implementation.

FIG. 4 illustrates an optical package 120 according to another implementation. The package has a cap 122 and a base 126, which includes a surface-machined micro-lens 152 formed integrally with the base. The lens 152 may be formed, for example, as a spherical protrusion from the base 126.

The cap 122 includes a recess 128 on its underside. However, in contrast to the implementation of FIG. 1, at least one of the walls 150 of the recess 128 is slanted at an angle β of about 45°. The portion of the sidewall 150 adjacent the optical output of the laser 30 is coated with a metal material which acts as a reflecting surface 136 to redirect the light beam 138 from the laser toward the lens 152. Thus, the light beam 138 may be redirected at an angle of about ninety degrees (i.e., substantially perpendicular) to the lens 152. The precise angle may be selected to reduce back reflection into the laser and to achieve efficient optical coupling to the fiber.

Although formation of the recess 128 with sidewalls close to a 45° angle may be somewhat more complex than formation of the recess in FIG. 1, the design of FIG. 4 may reduce the likelihood of misalignment because the package 120 need not include a lens holder plate separate from the base.

As shown in FIG. 4, an edge-emitting semiconductor laser 130 and a monitor diode 132 are mounted within the recess of the cap 122. Hermetically sealed feed-through connections 146, which may be formed, for example, as described above, couple the metallization on the underside of the cap 126 to electrical contacts on the outside of the cap. As in the implementation of FIG. 1, the base 126 should comprise a material, such as silicon or glass, that is transparent to the wavelength of light emitted by the laser 130.

Figure 5:
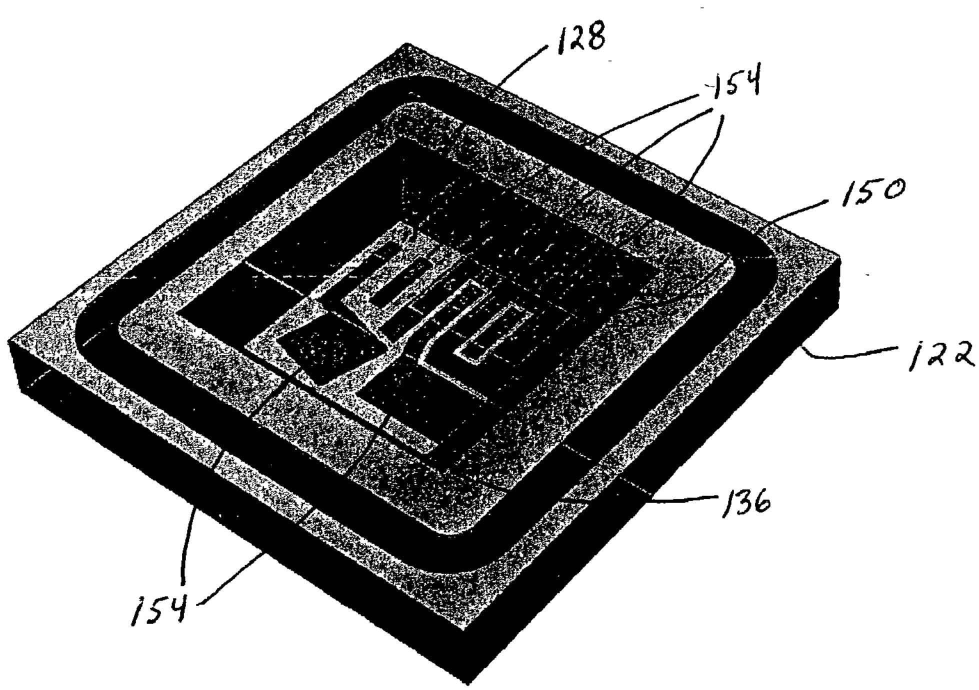
FIGS. 5 and 6 illustrate the cap in the optical package of FIG. 4.
Figure 6:
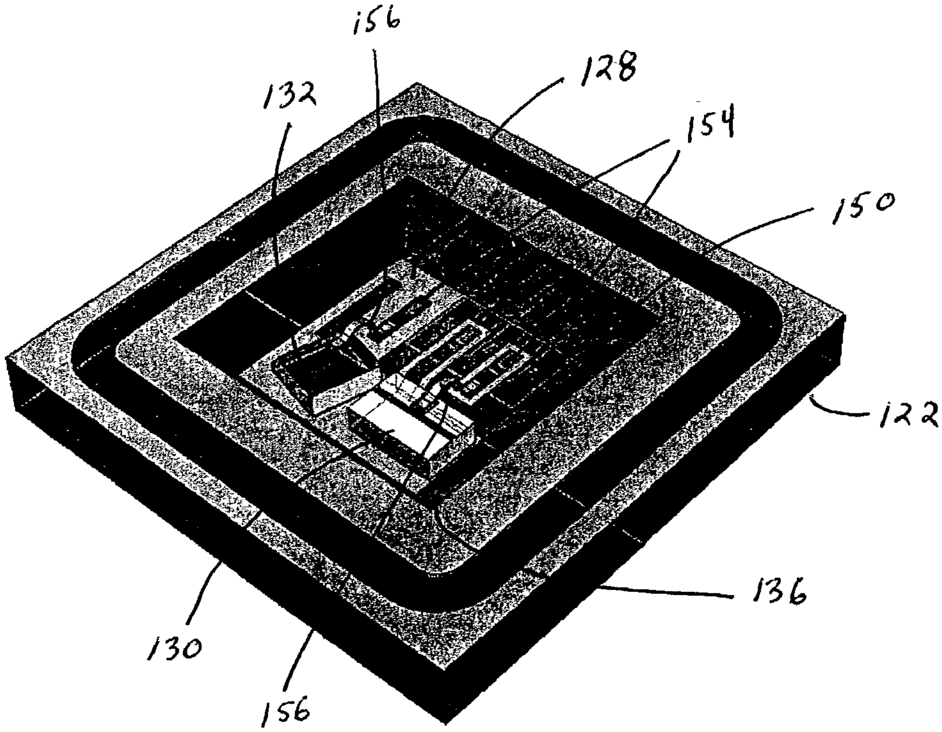

FIGS. 5 and 6 illustrate additional details of the cap 122 according to a particular implementation. Metallization 154 in the recess provides the electrical contacts for the laser 130 and monitoring diode 132. Bond wires 156 or other electrical connections may be provided to couple the laser and monitor diode to other ones of the metallization areas.

Figure 7:
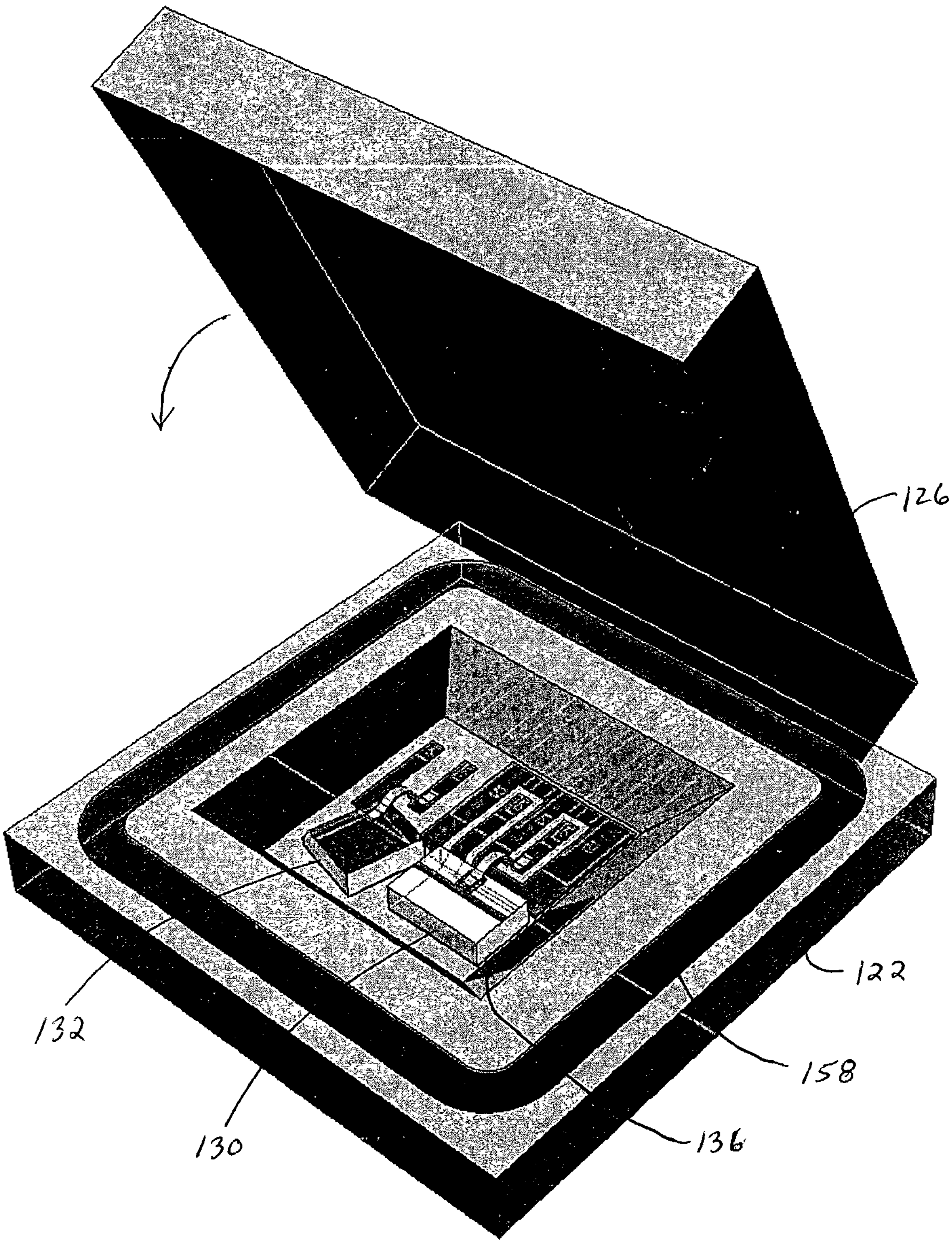
FIG. 7 illustrates assembly of the cap and base of the optical package of FIG. 4.

To complete the package 120, the base may be fused to the cap 122 using a metal or glass solder ring 158 (see FIG. 7) to form a hermetic seal. Thus, a hermetically sealed optical package with an integrated lens may be provided. The light beam redirected by the reflecting surface 136 is collimated by the lens 152 (not shown in FIG. 6), and the substantially collimated beam exits the package.

Figure 8:
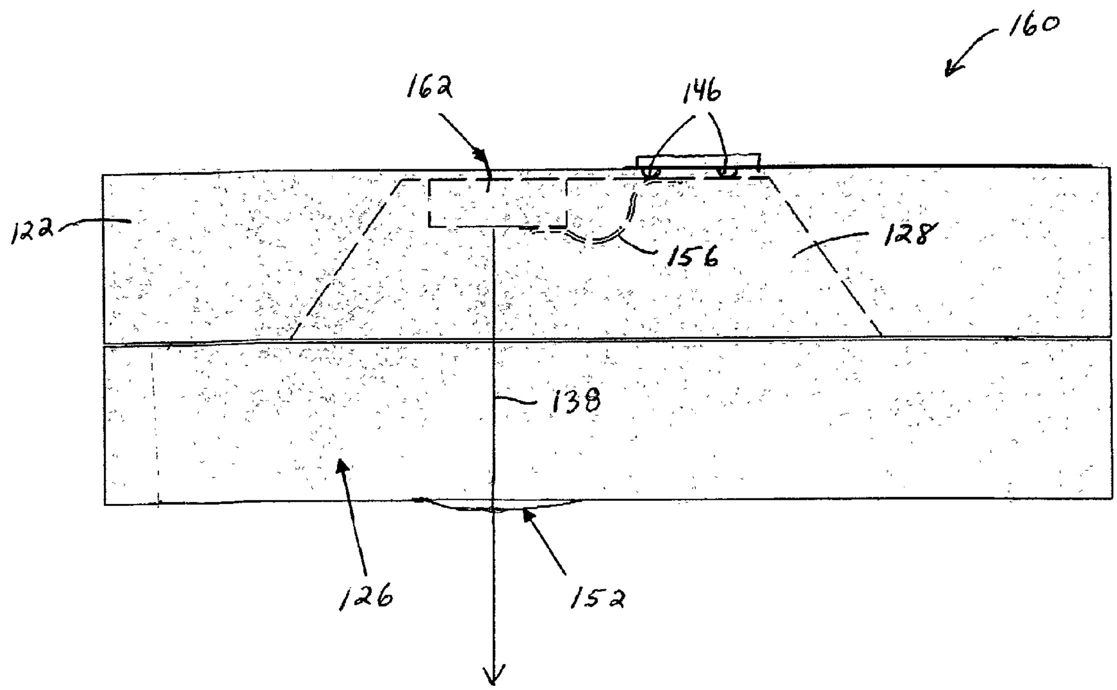
FIG. 8 illustrates a cross-sectional view of an optical package with an integrated lens according to another implementation.

FIG. 8 illustrate an optical package 160 similar to the package of FIG. 4. The package 160 includes a cap with a recess 128 and a base 126. The base includes a surface-machined lens 152 that may be integrally formed with the base. However, instead of an edge-emitting laser, a surface emitting light source 162 is mounted in the recess 128. Examples of such surface emitting devices include vertical cavity surface emitting lasers (VCSELs). Use of a surface emitting light source allows the light beam to be directed to the lens 152 without the need to redirect the emitted beam with a reflecting surface on the sidewall of the recess. Thus, formation of the package 160 may require fewer steps than the packages illustrated in FIGS. 1 and 4. Furthermore, formation of the recess can be simplified as in the package of FIG. 1 because the angle of the recess' sidewalls may be less critical.

As described above, the package 160 may include hermetically sealed feed-through connections 146 to electrically couple contacts on the outer surface of the cap to the components encapsulated within the package.

If opto-electronic devices designed to operate at a wavelength below the transparency limit of silicon are encapsulated in the package, the base may be made, for example, of a suitable glass, and the lens may be formed of a suitable polymer to allow the optical signals to pass through the lens and base.

Figure 9:
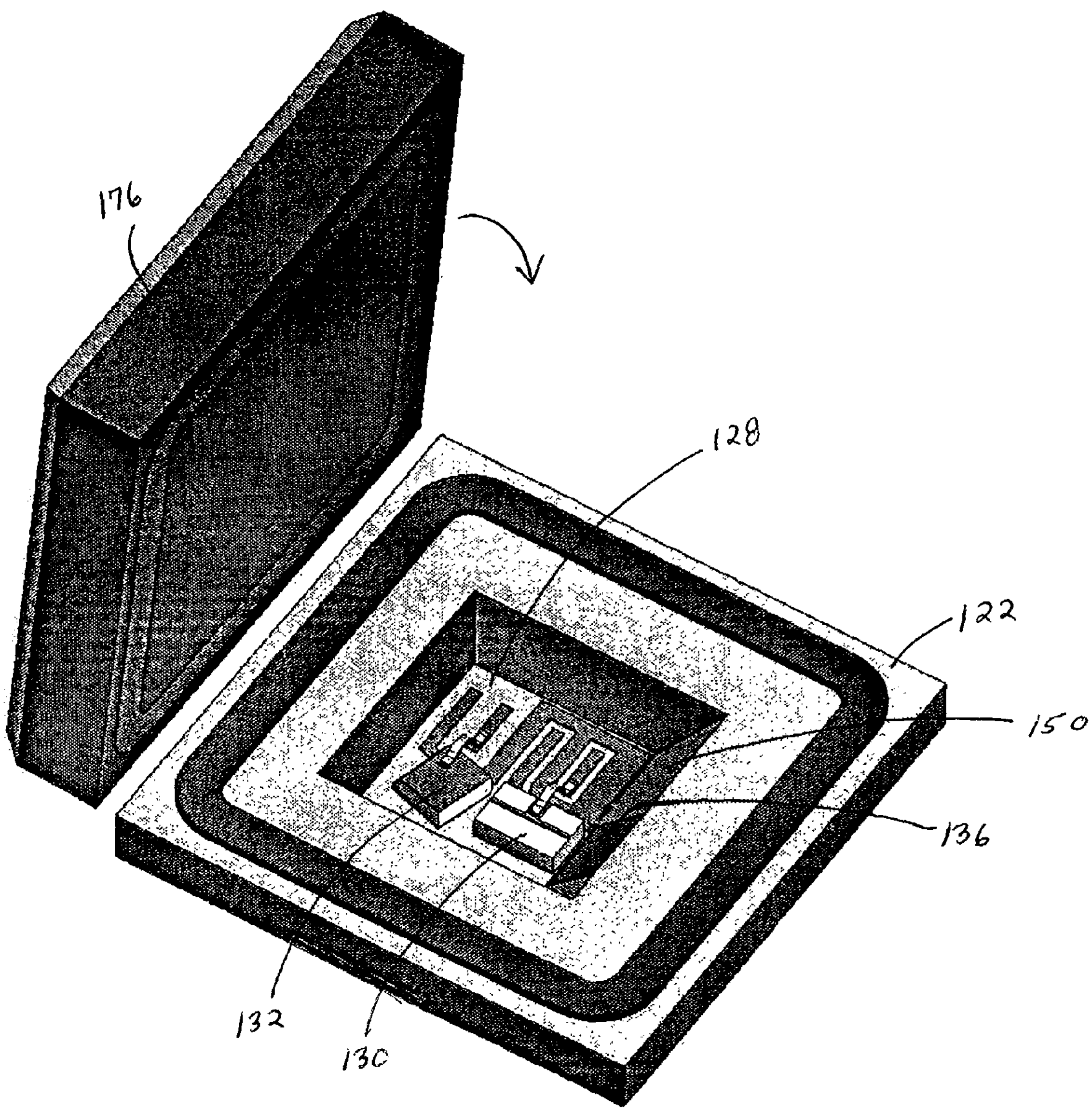
FIGS. 9–11 illustrate a further implementation of an optical package with an integrated lens.
Figure 11:
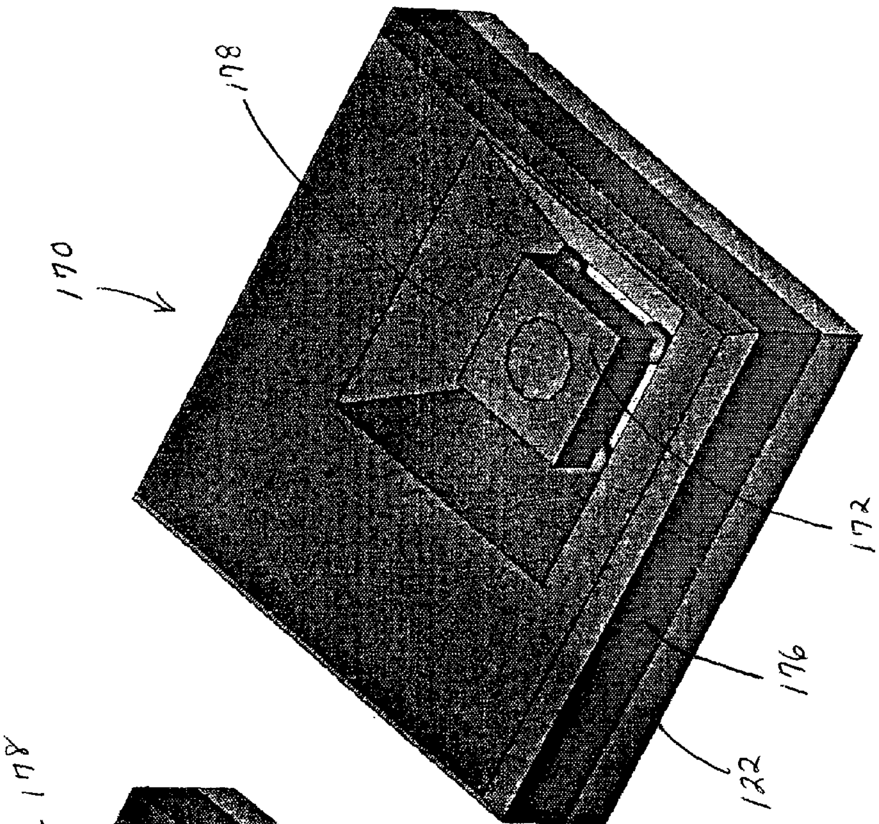
Figure 10:
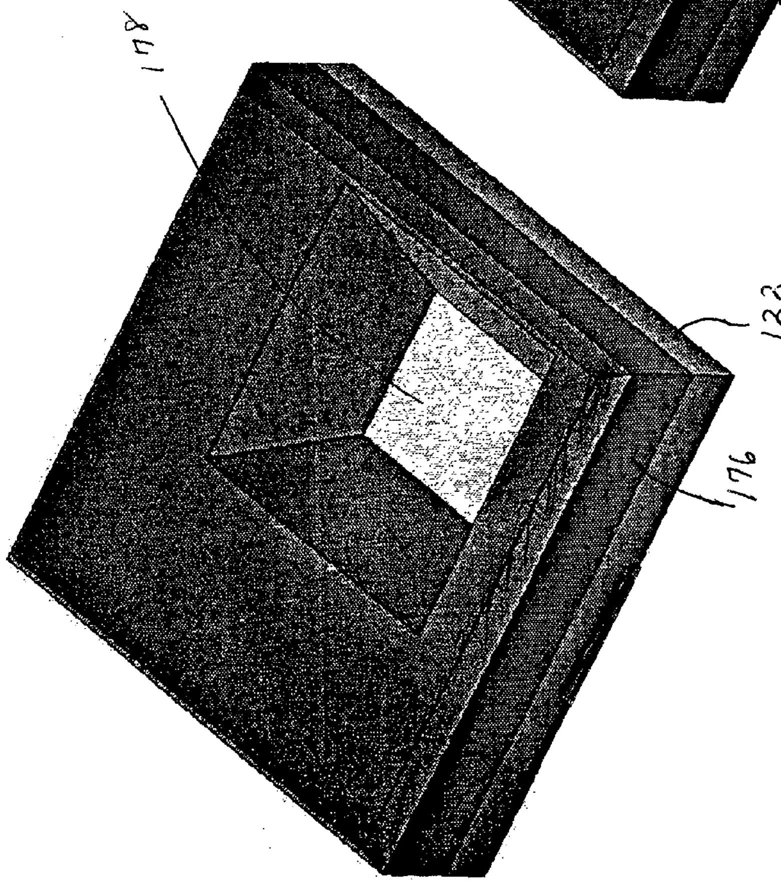

FIGS. 9–11 illustrate yet another embodiment of a package 170 in which, instead of a surface-machined micro-lens formed integrally with the base, a lens 172 is integrated as part of the package by attaching it to the exterior of the base 176. As in the implementation of FIGS. 4–7, an edge-emitting semiconductor laser 130 and a monitor diode 132 are shown mounted within the recess 128 of the cap 122. As described above, the portion of the sidewall 150 adjacent the optical output of the laser 130 is coated with a metal material which acts as a reflecting surface 136 to redirect the light beam from the laser toward the lens 172. Hermetically sealed feed-through connections 146, which may be formed, for example, as described above, couple the metallization on the underside of the cap 126 to electrical contacts on the outside of the cap.

As in the previous embodiments, the base 176 should comprise a material, such as silicon or glass, that is transparent to the wavelength of light emitted by the laser 130. When the base is positioned over and fused to the cap 126, for example, using a metal or glass solder ring, a hermetic seal is formed. The lens 172 may be mounted within a pyramid-shaped recess 178 (FIGS. 10–11) formed on the exterior side of the base to position the lens closer to the laser. As shown in FIG. 11, a hermetically sealed optical package with an integrated lens is provided. The light beam redirected by the reflecting surface 136 (FIG. 9) passes through the base and may be collimated by the lens 172 so that a substantially collimated beam exits the package.

In another implementation, the top surface surrounding the recess 178 can be used to mount a second bulk optical element, such as a second lens, in a control distance from the first lens 172. This might be advantageous if the laser 130 has a strongly elliptical beam profile. The first lens 130 may be have a cylindrical shape to collimate the fast axis of the laser beam partially, and the additional second lens may be a spherical lens to perform the remaining collimation.

In some implementations, for example, where a surface-emitting laser is encapsulated within the package 170, the recess 178 in the base 176 may not be needed. In that case, the lens 172 may be mounted on the planar surface of the base exterior.

The foregoing examples use a light source as the opto-electronic component that is housed within the optical package and whose optical output can be collimated by the lens. However, in other implementations, an optical receiving device such as a PIN diode may be disposed within the package to receive a light beam that passes through the integrated lens. Therefore, each of the packages discussed above may be used with either a light emitting or light receiving device. If a light receiving device is housed within the package, then the base should be transparent to the wavelength of light that the light receiving device is designed to detect.

The terms "cap" and "base," as used in this disclosure, are not intended to imply a particular orientation of those sections with respect to the top or bottom of the package. In some implementations, the cap may be located above the base, whereas in other implementations, the cap may be located below the base.

In some implementations, multiple packages may be processed on a semiconductor wafer prior to dicing the wafer into separate chips.

The various packages described above may be incorporated into an optical assembly and allow for the surface-mounting of opto-electronic components onto circuit boards using standard circuit assembly equipment. One advantage of providing a lens that is integrated as part of the optical package is that the light beam emitted from the package may be substantially collimated. The collimated light beam allows other optical components, such as beam splitters and optical isolators, to be placed in the light path before the light beam enters the optical fiber. Similar advantages may be obtained for implementations in which light from the optical fiber is coupled to an optical receiving device encapsulated within the package.

Figure 12:
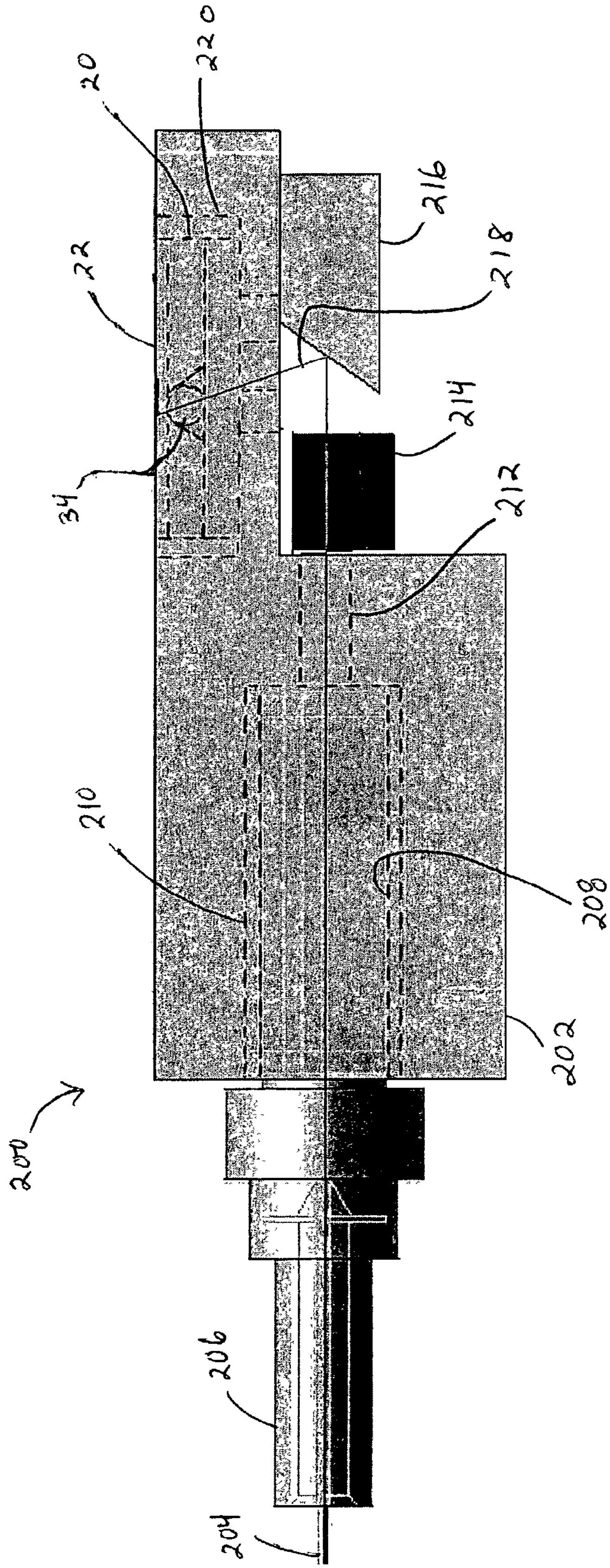
FIG. 12 illustrates an optical fiber connector-receptacle type assembly which incorporates one of the optical packages.

For example, as shown in FIG. 12, the package 20 of FIG. 1 may be incorporated into an assembly 200. The assembly includes a housing 202 which includes a recess 220 to receive the package 22. The housing may be made, for example, from metal using precision milling and drilling. A connector-receptacle for an optical fiber 204 includes a ceramic ferrule 206 which may be positioned within the housing by a ferrule sleeve 210. A cylindrical lens 212 such as a graded index (GRIN) lens may be disposed within a step bore in the housing between the fiber end and an optical isolator 214. The optical isolator can be used to prevent light reflected from the optical fiber transmission line and the fiber connector from entering the semiconductor laser within the package 22. A mirror 216 serves to redirect the path 218 of the light beam from the package 22 to the fiber 204.

Efficient optical coupling between the fiber 204 and the light emitting device in the sealed package 22 may be simplified as a result of the integrated lens 34 in the package and the cylindrical lens 212 in the assembly, both of which serve to collimate the light beam. Active alignment may be achieved by adjusting the position of the mirror 216. The mirror may be fixed in place, for example, with an adhesive. The assembly illustrated in FIG. 10 may be mounted to a circuit board (not shown) by flipping over the assembly so that the integrated package 22 is adjacent the circuit board and so that electrical connections are made between the package and the circuit board, for example, through a metal solder.

Figure 13:
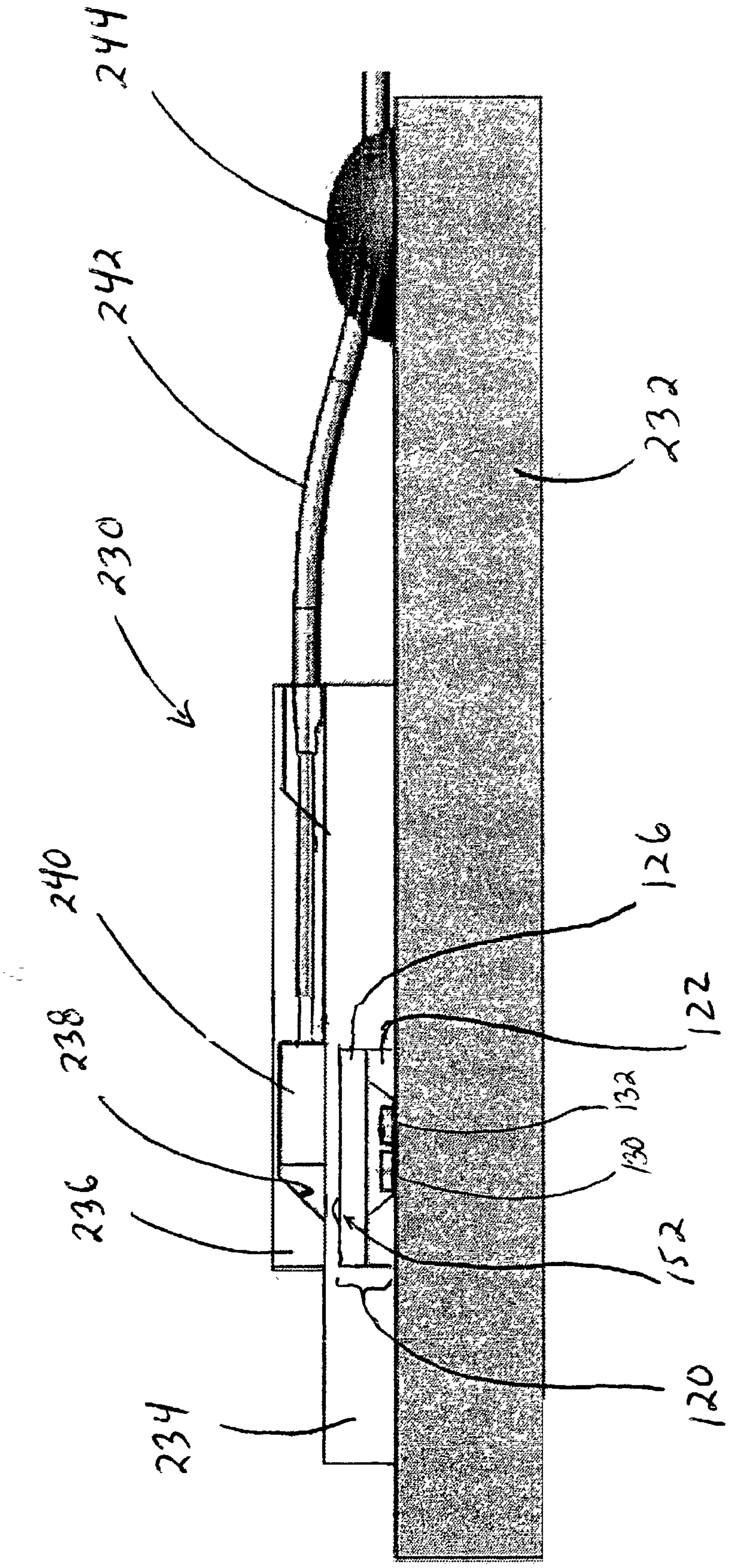
FIG. 13 illustrates an optical fiber pigtail type assembly which incorporates one of the optical packages.

In another implementation, an optical fiber may be optically coupled to the package 120 using a pigtail design, as shown, for example, in FIG. 13. A glass plate housing 234 includes a cut-out recess to hold the package 120, including the cap 122, the base 126 and the integrated lens 152. The fiber 242 may be optically coupled to a GRIN lens 240 held in place by a silicon plate 236. The silicon plate 236 also includes a V-groove 238 with an angle of about 45°. One end of the V-groove may be metallized to serve as a reflecting surface or mirror 236 to redirect the light beam from the light emitting device in the package 120 to the fiber. The glass plate housing 234 also serves as a cover to the V-groove and may provide additional stability to the assembly.

Active alignment may be performed by moving the entire fiber holder. Following the alignment process, an ultra-violet (UV) curable adhesive may be used to attach the assembly to the circuit board 232. An additional strain relief may be provided by gluing the fiber pigtail onto the circuit board 232 with a drop of adhesive 244.

Figure 14:
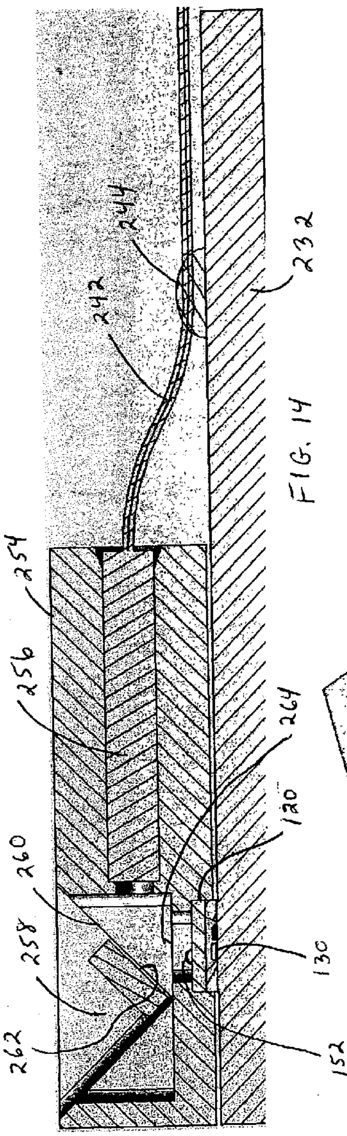
FIGS. 14 and 15 illustrate an optical fiber pigtail type assembly which incorporates one of the optical packages.
Figure 15:
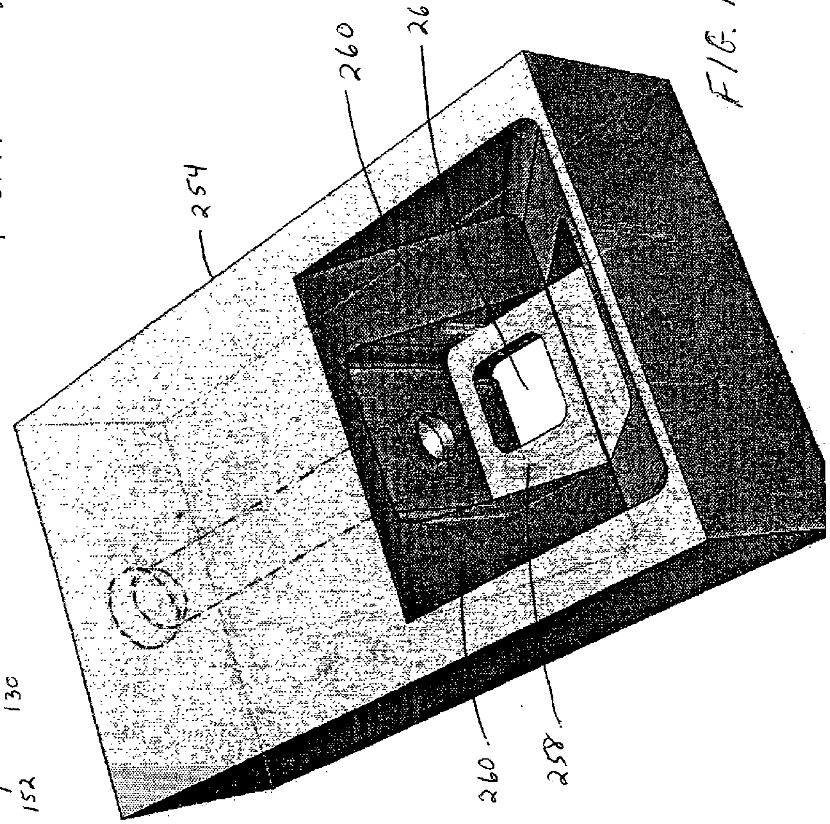

FIGS. 14 and 15 illustrate another assembly in which an optical fiber 242 is optically coupled to an edge-emitting laser 130 using a pigtail design. A metal housing 254 includes a cut-out recess to hold the optical package, which may be glued into the cut-out recess. In the illustrated implementation, the assembly holds the package 120 of FIG. 4 with the integrated lens 152 and hermetically sealed edge-emitting laser 130. However, the assembly also may be used with the other packages discussed above. The fiber 242 may be optically coupled to the laser 162 through a collimator and GRIN lens assembly 256. The metal housing includes a milled cut-out region 258 with slanted walls to support a mirror or other reflecting surface 262 at an angle of about 45°. Active alignment of the mirror may be performed, for example, using an infrared camera aimed down the bore of the collimator assembly. The mirror then may be attached to the slanted walls by an adhesive. The entire assembly may be mounted on a printed circuit board 232.

Light emitted by the laser 130 and reflected by the mirrored side wall of the cap passes through the base of the package 120 and may be substantially collimated by the lens 152. The collimated light beam passes through an opening 264 in the metal housing and is reflected by the mirror 262. The reflected beam passes through the collimator and GRIN lens assembly 256 into the fiber 242.

In various implementations, additional or alternative optical components such as optical isolators may be inserted into the path of the light beam as well.

In some implementations, multiple packages as describe above may be incorporated into a single fiber connector-receptacle. For example, each package may include a laser of a different wavelength. Matching thin film filters may be provided to reflect the emitted light onto a common axis to combine the light beams into a single fiber holder assembly in a continuous wavelength division multiplexing (CWDM) application.

The assemblies also may incorporate packages in which a light receiving device serves as the opto-electronic device.

Figure 16:
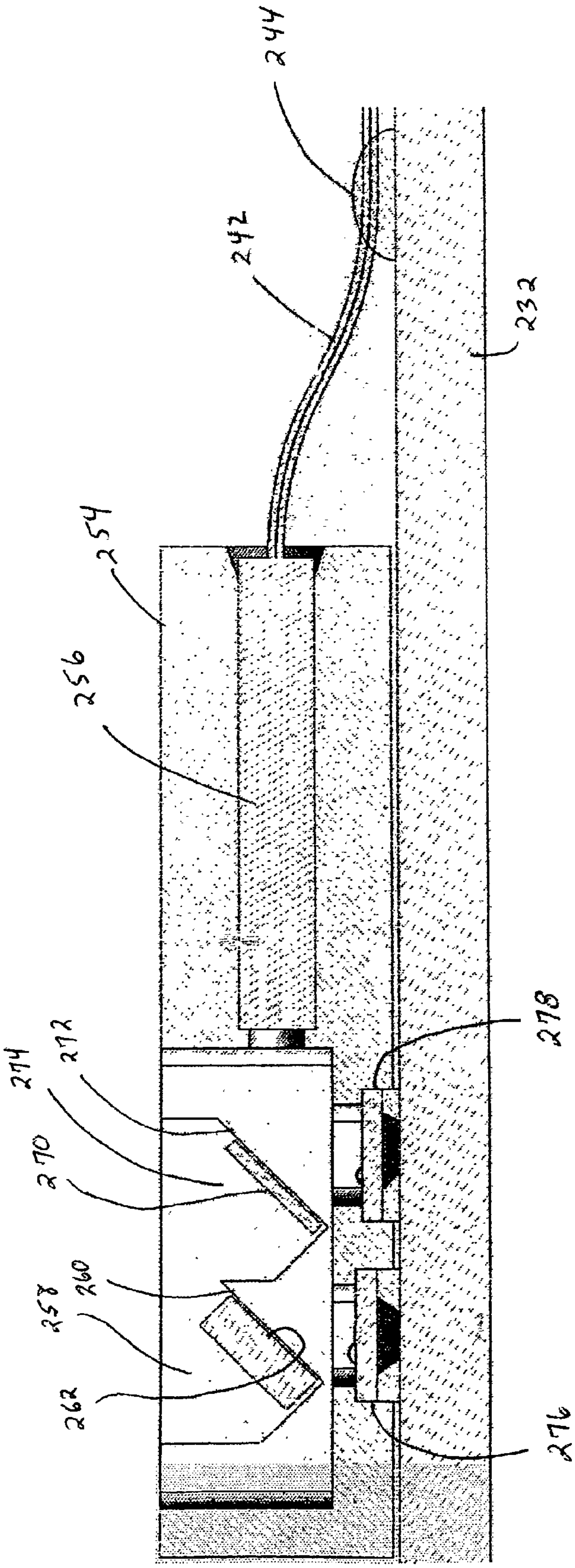
FIG. 16 illustrates an assembly that incorporates multiple optical packages.
Figure 1:
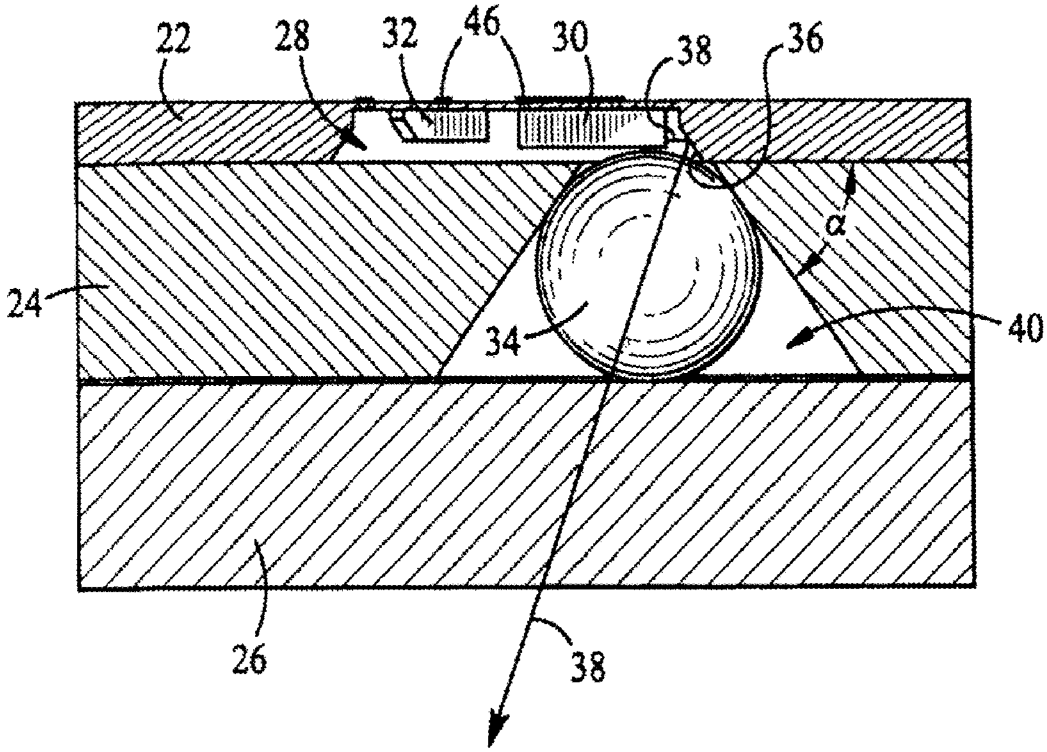
Figure 3:
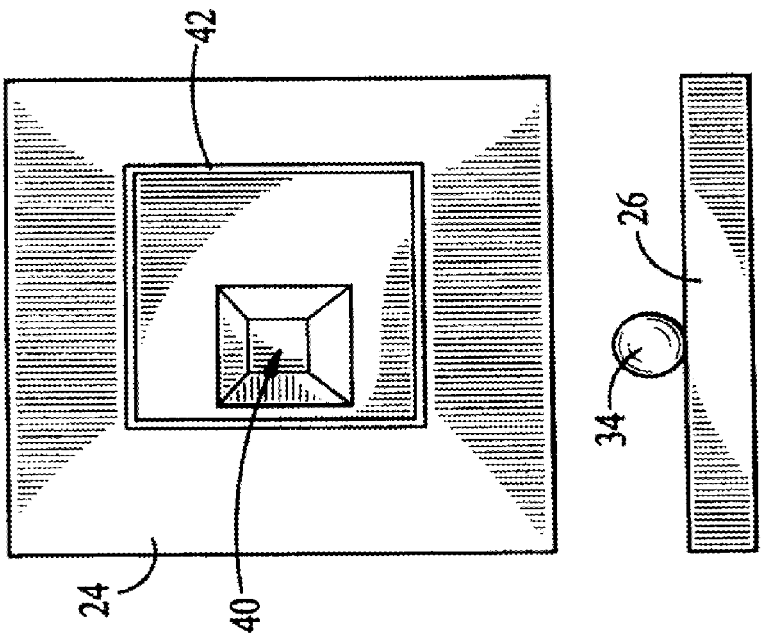
Figure 2:
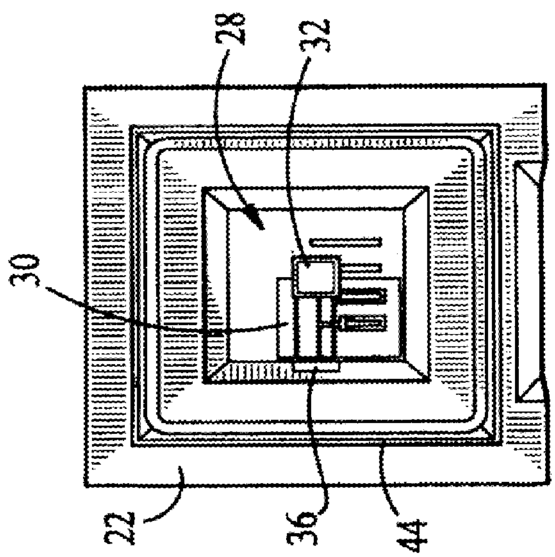
Figure 4:
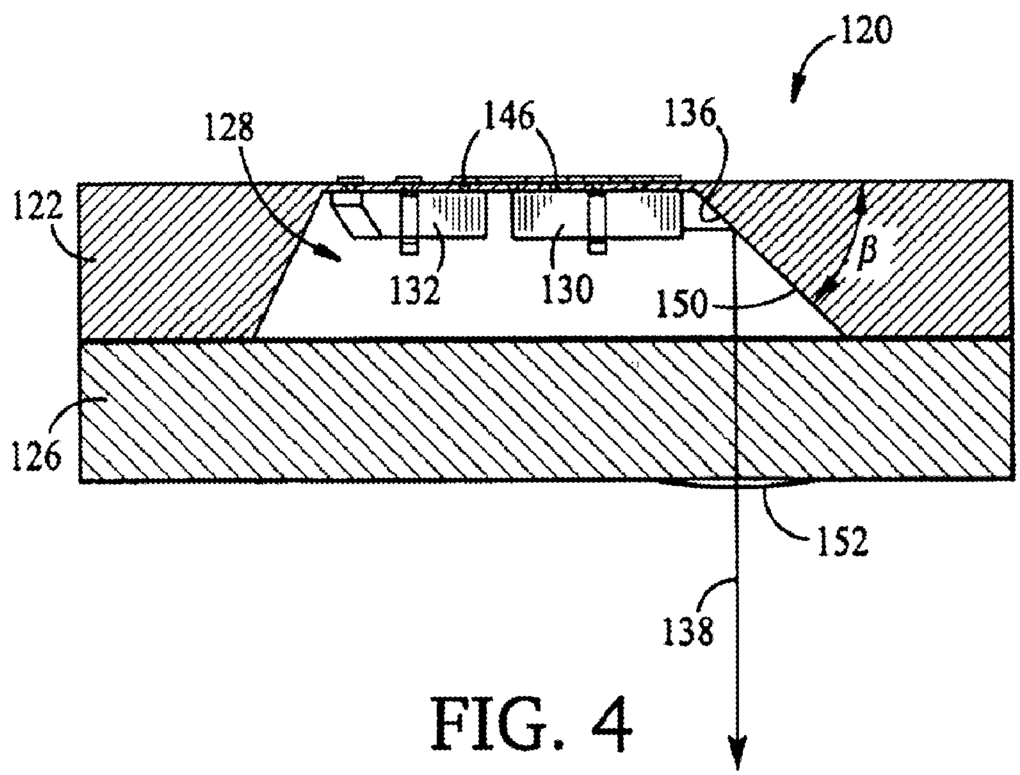
Figure 5:
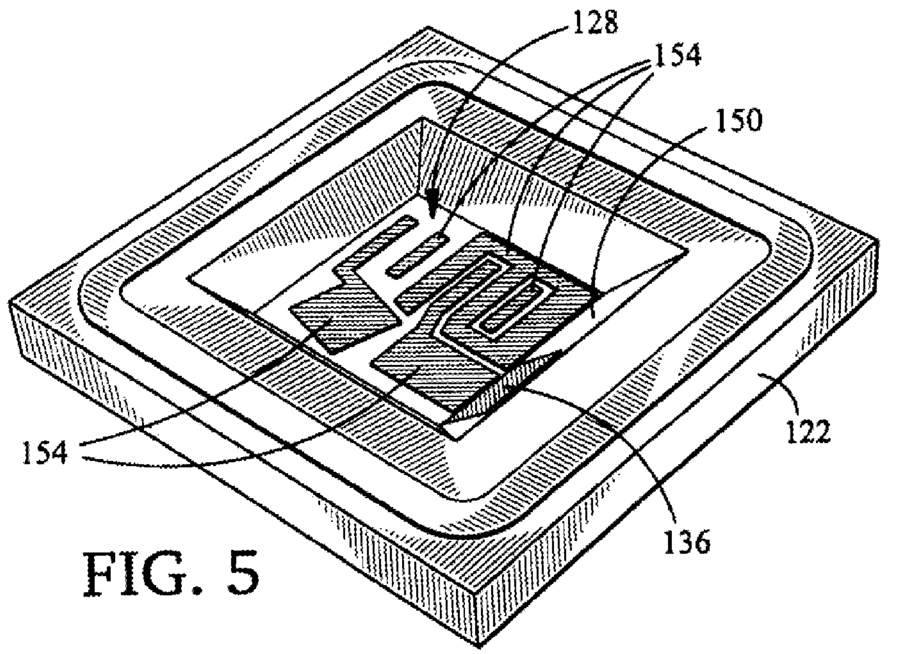
Figure 6:
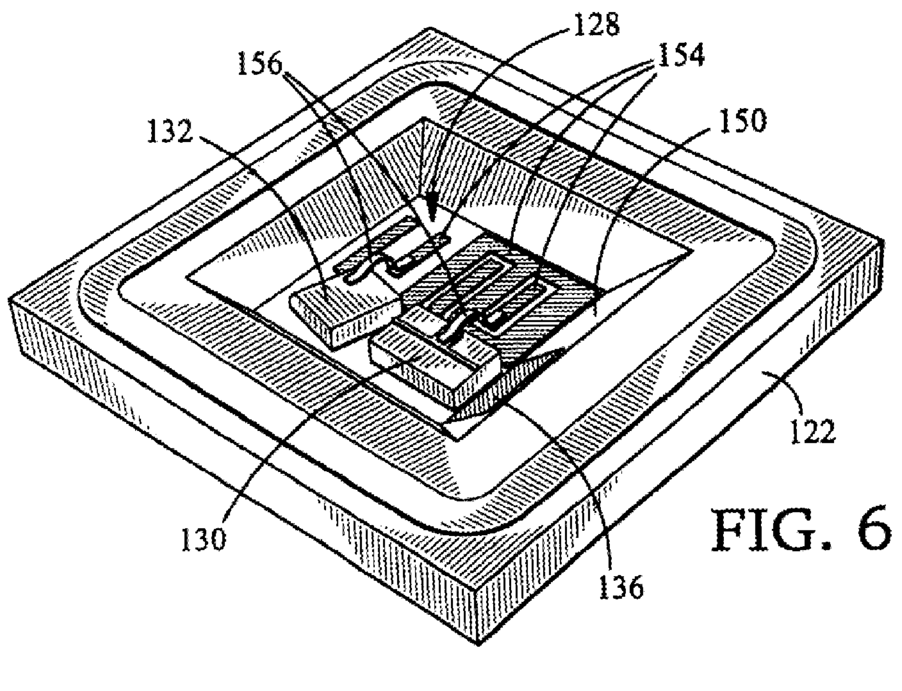
Figure 7:
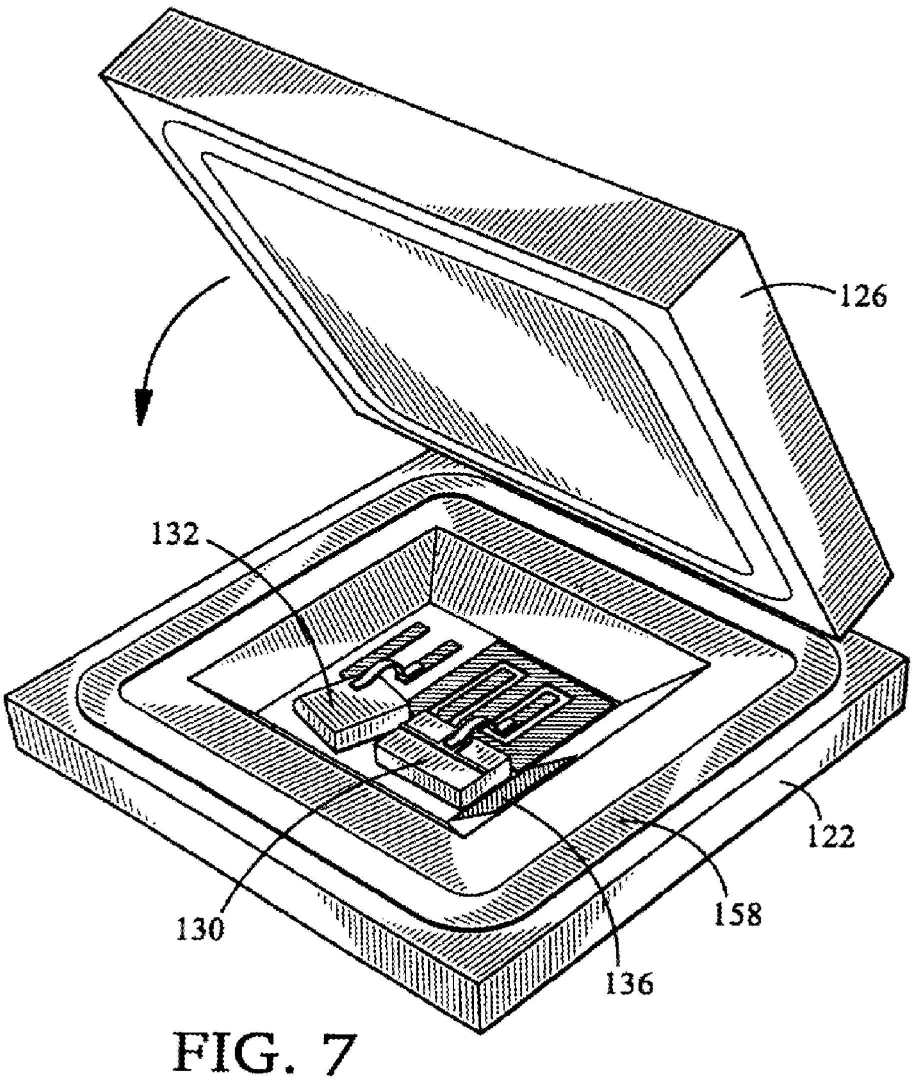
Figure 8:
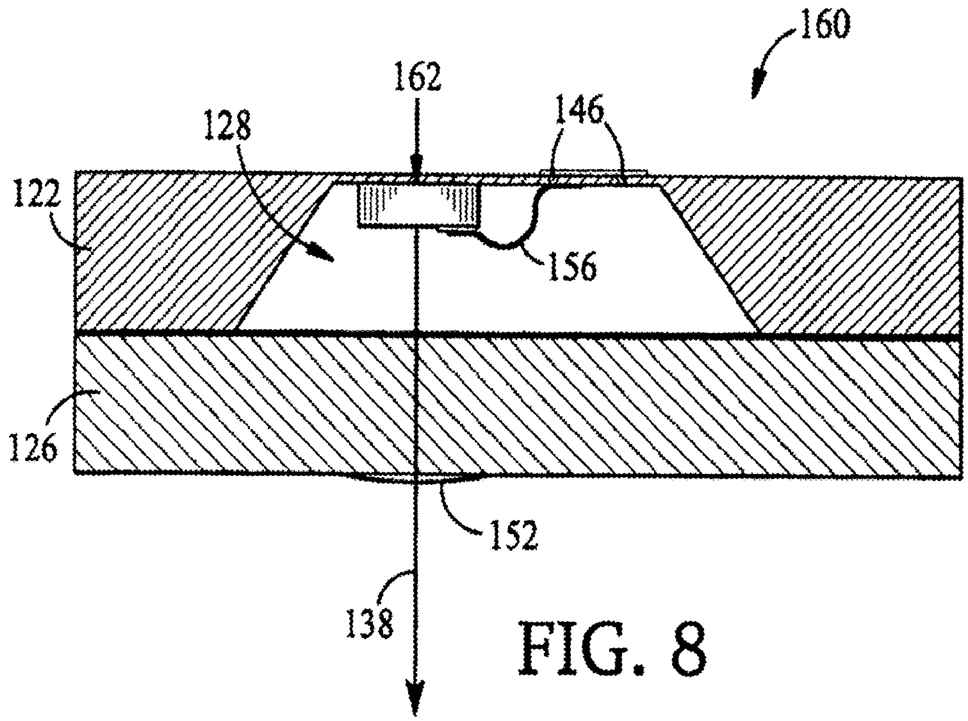
Figure 9:
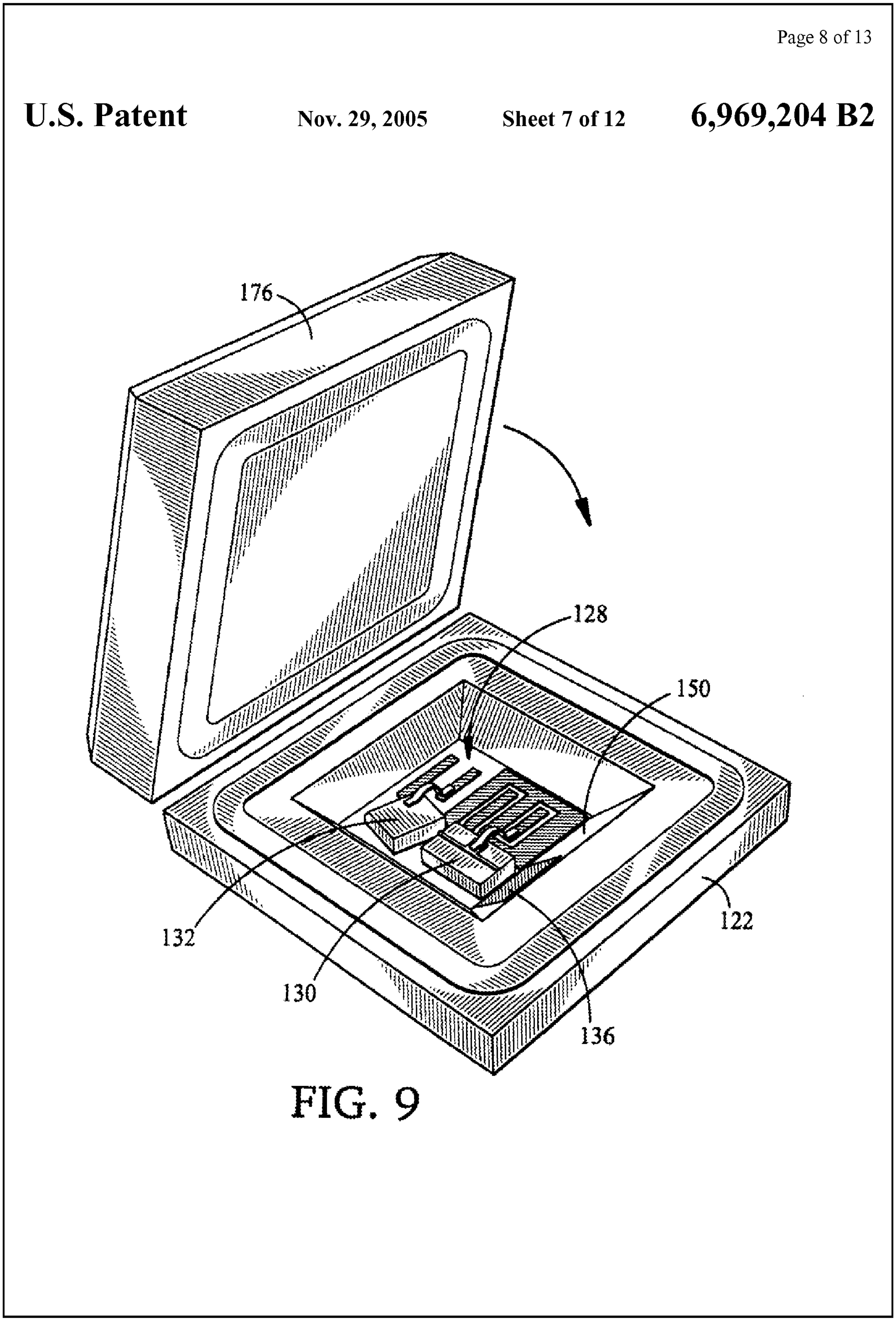
Figure 10:
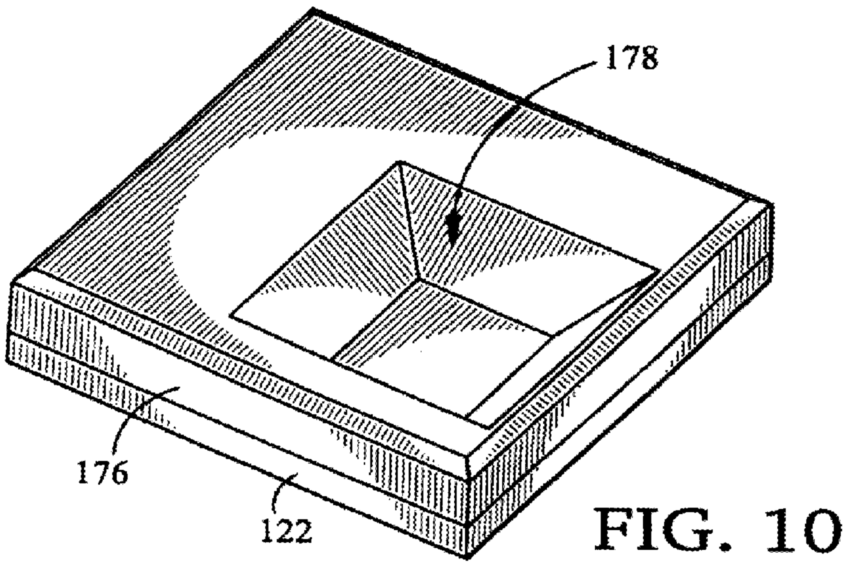
Figure 11:
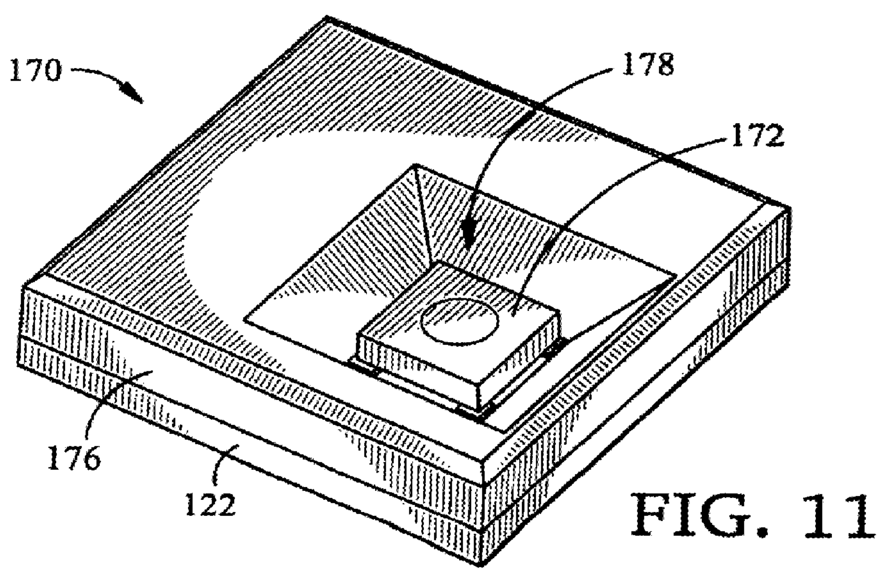
Figure 12:
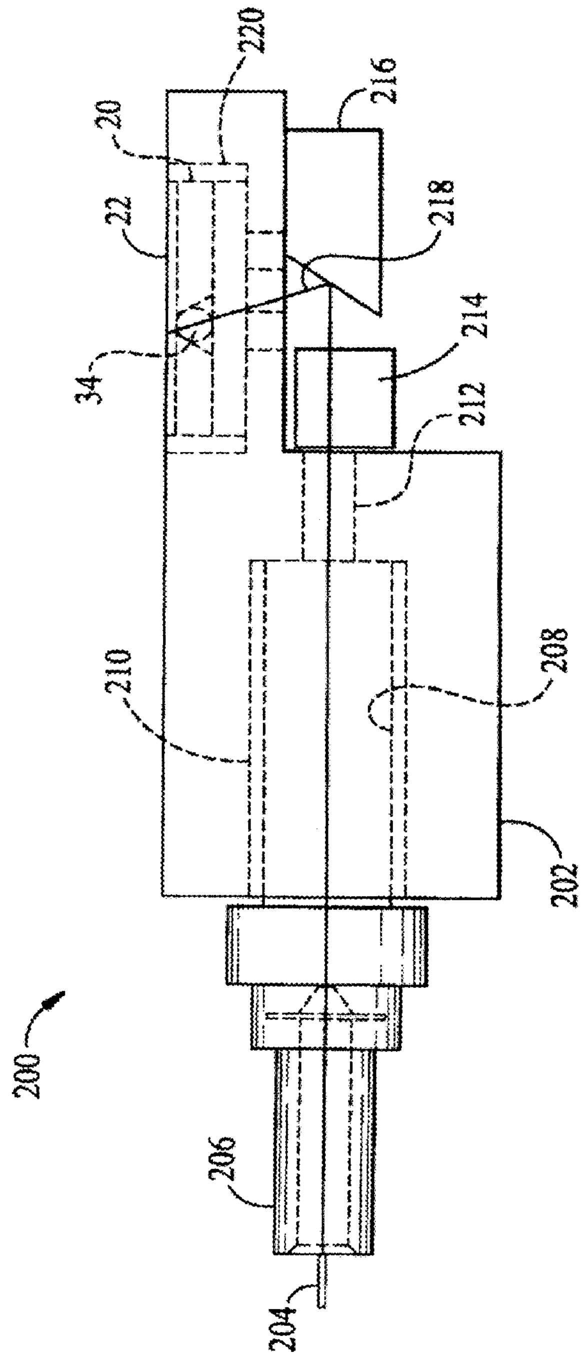
Figure 13:
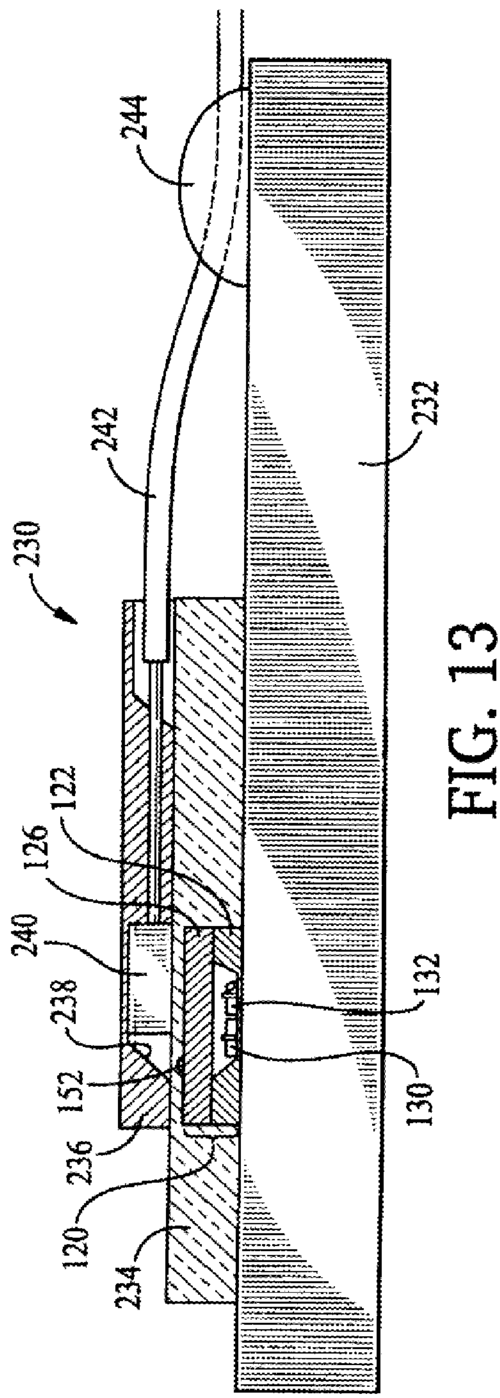
Figure 14:
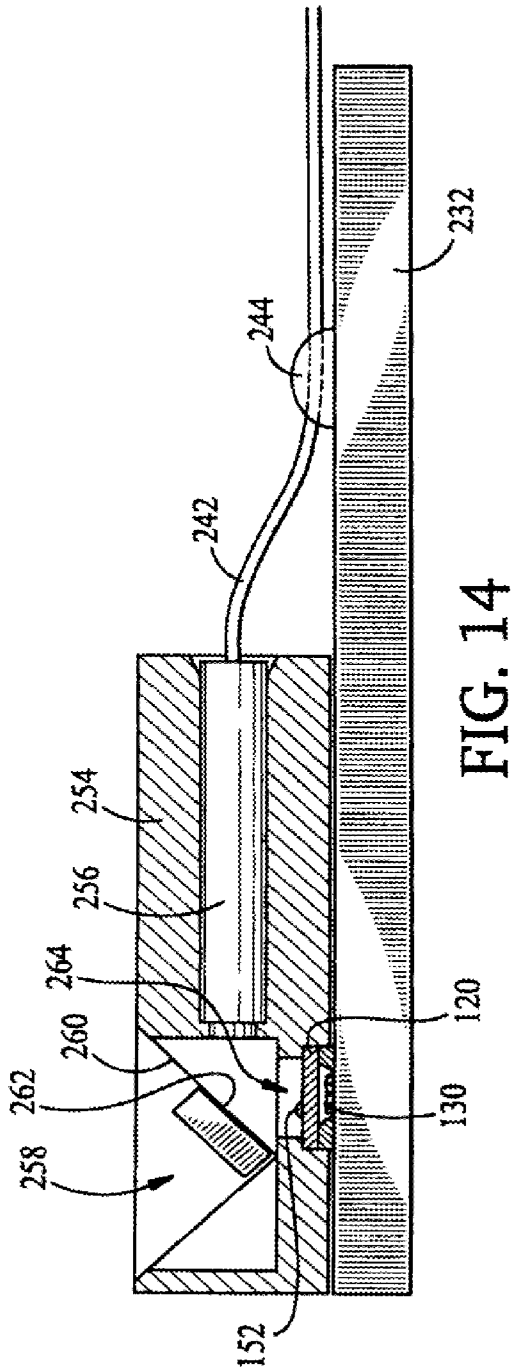
Figure 15:
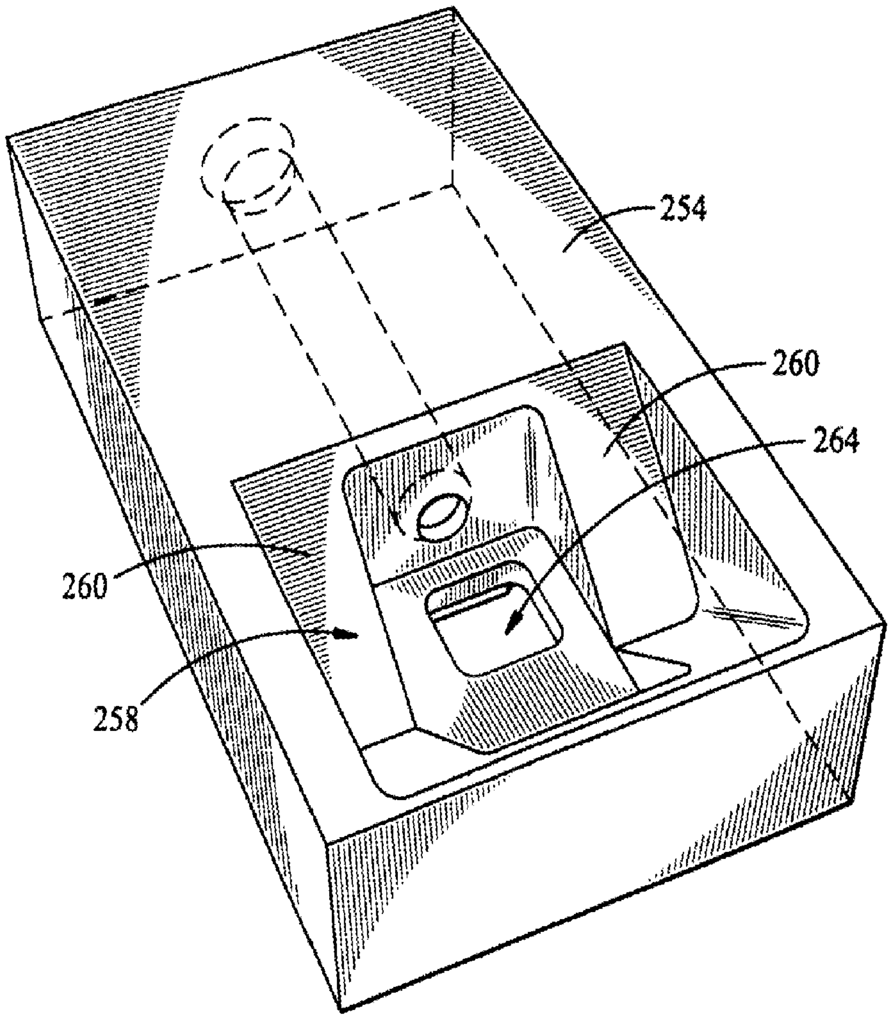
Figure 16:
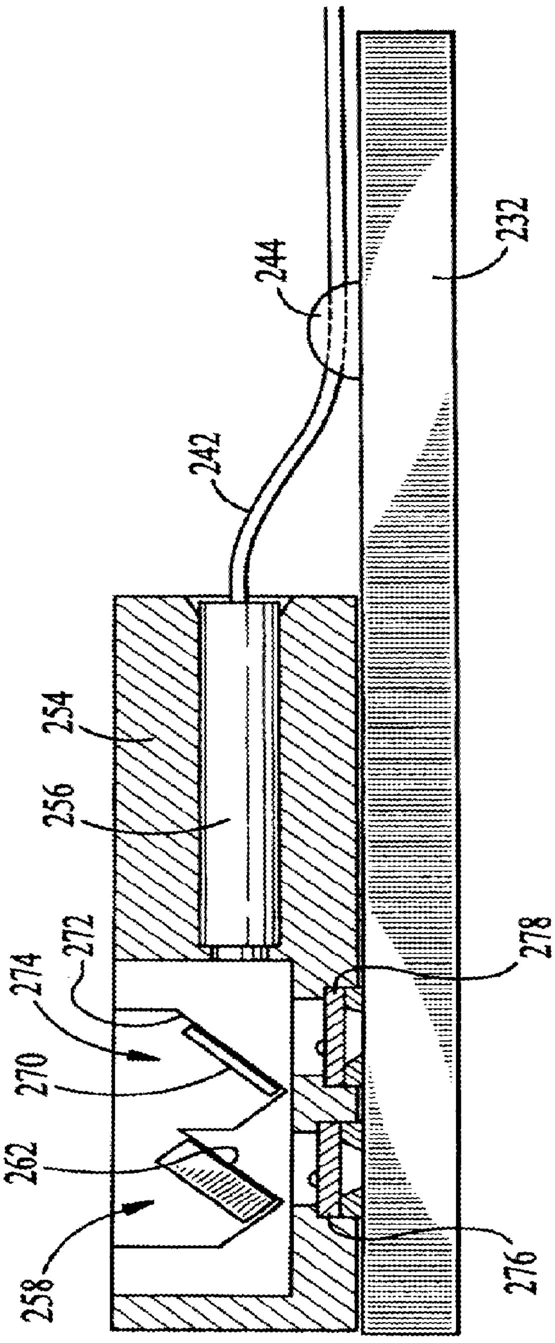
Figure 1:
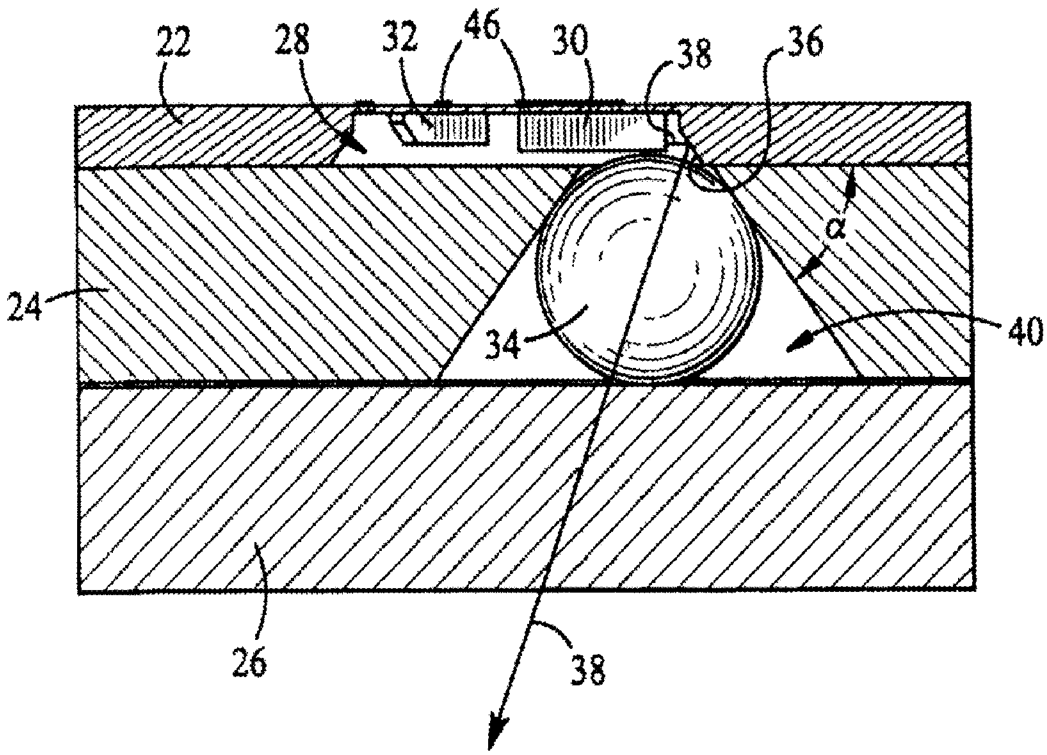
Figure 3:
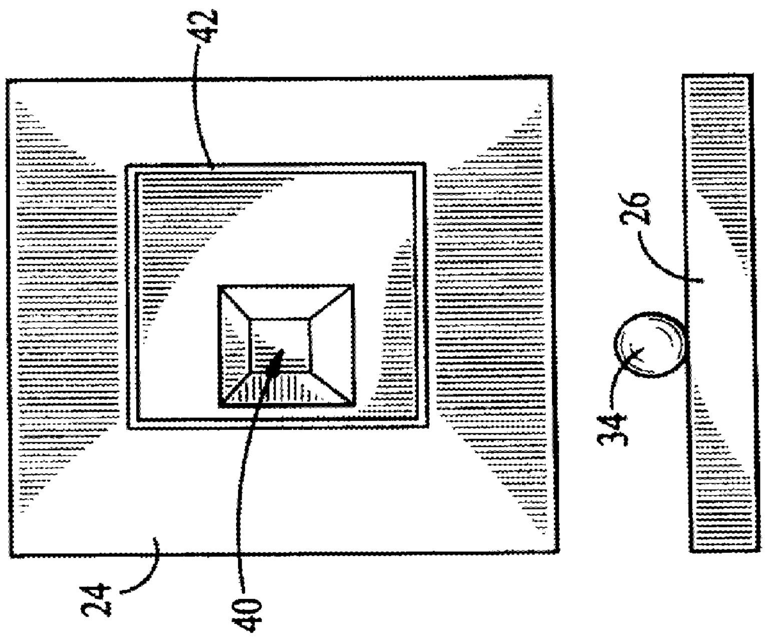
Figure 2:
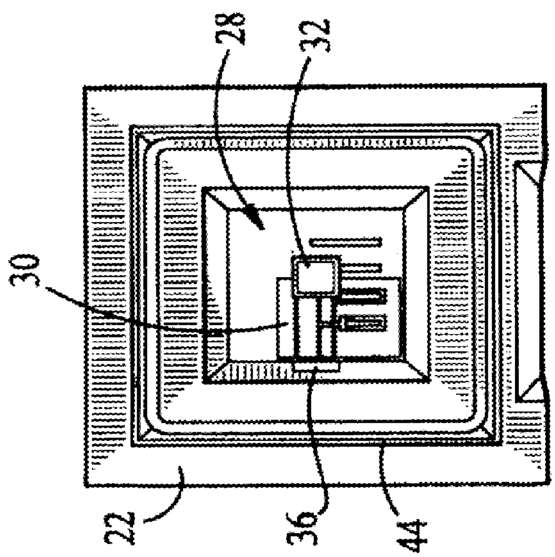
Figure 4:
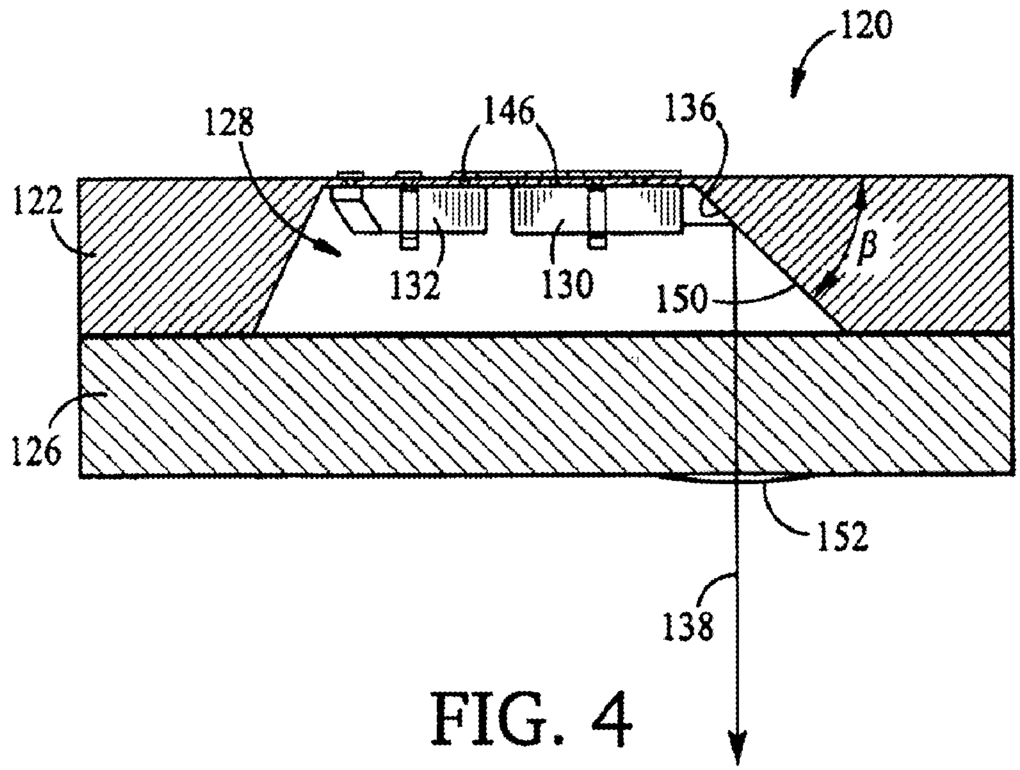
Figure 5:
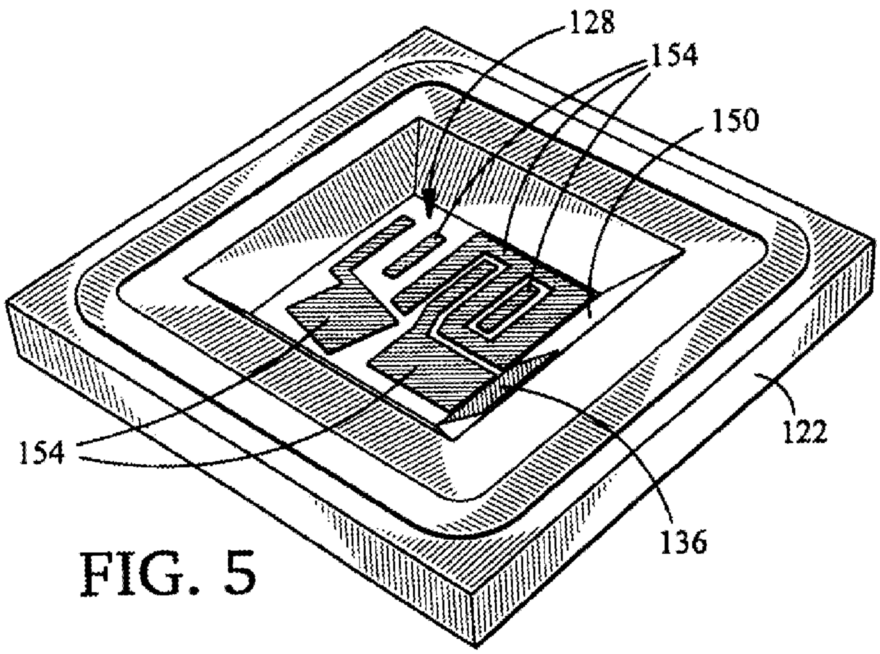
Figure 6:
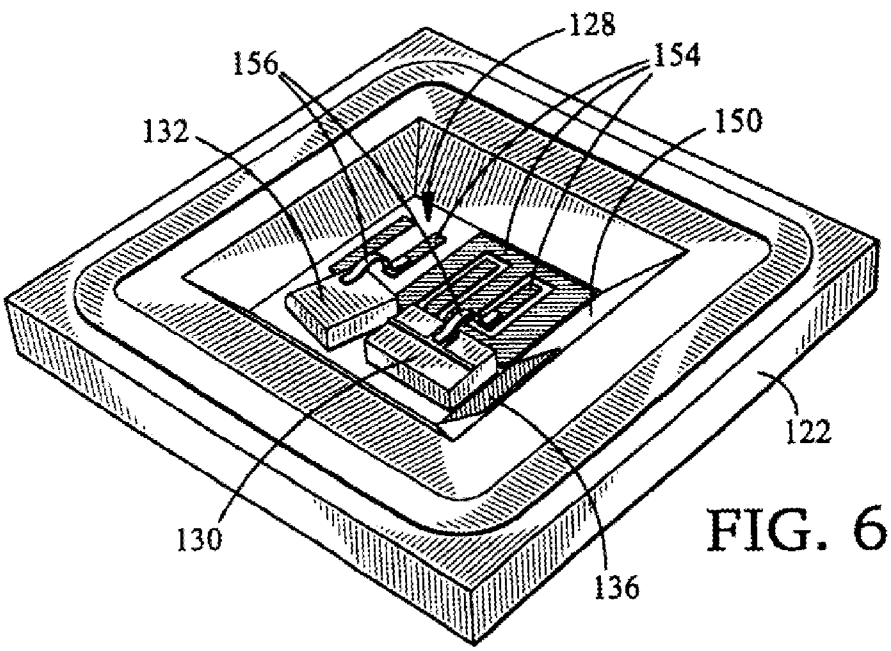
Figure 7:
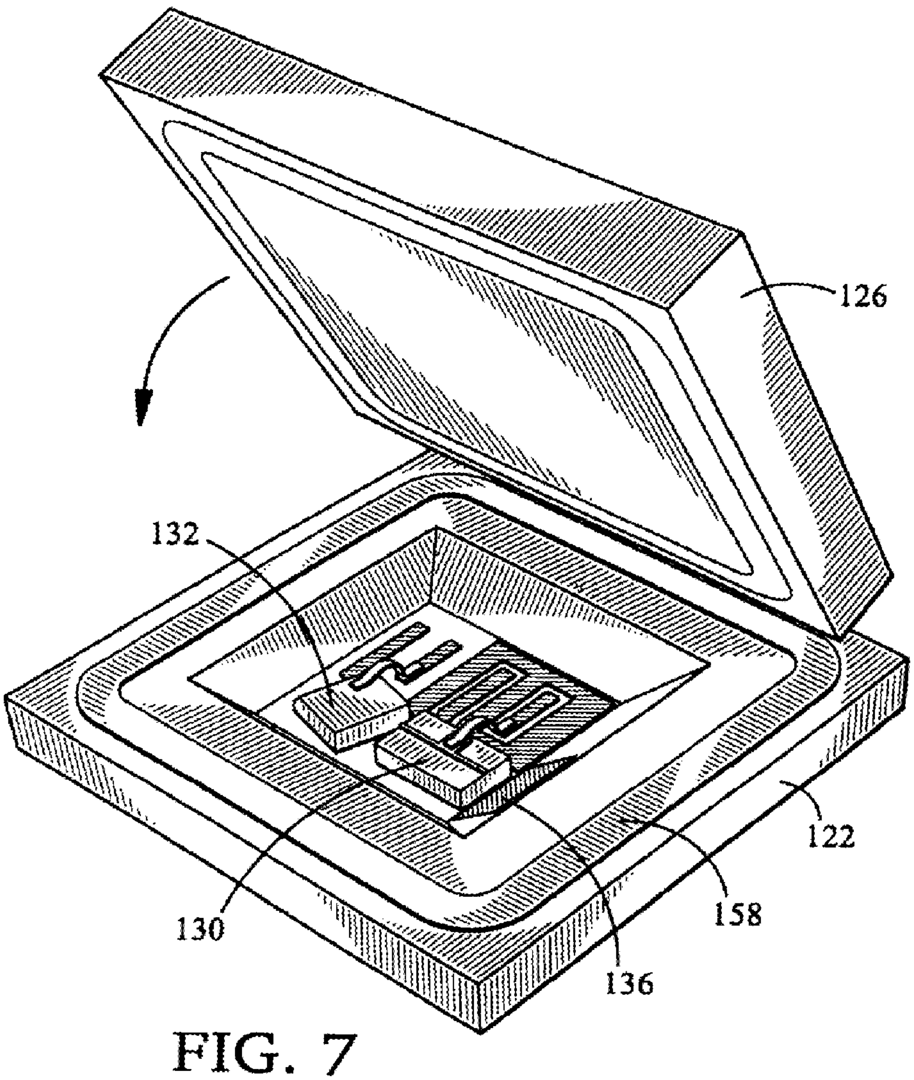
Figure 8:
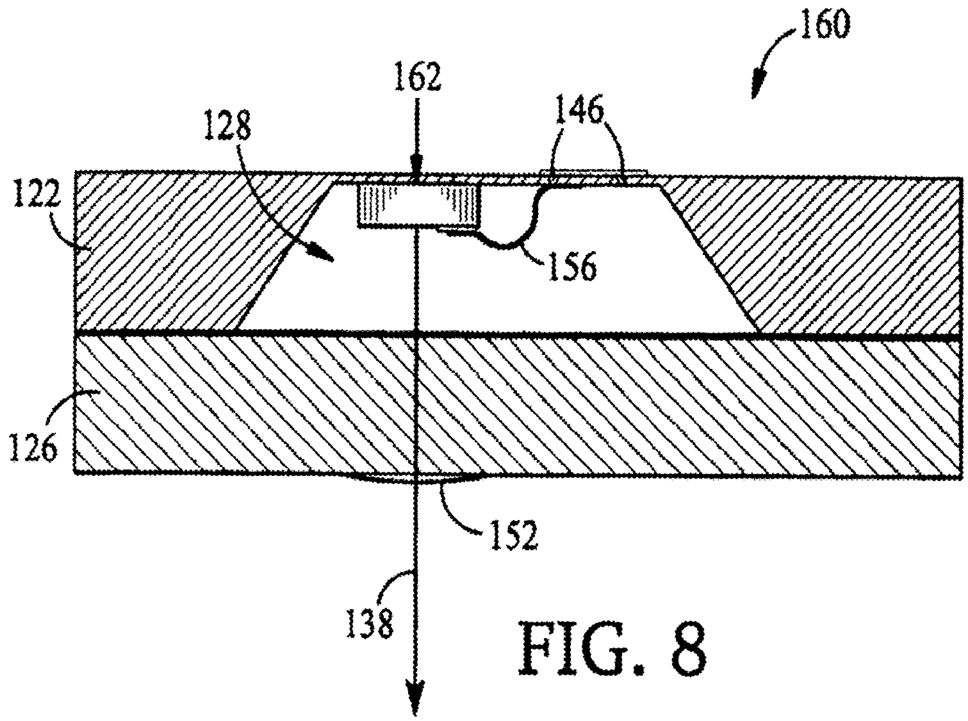
Figure 9:
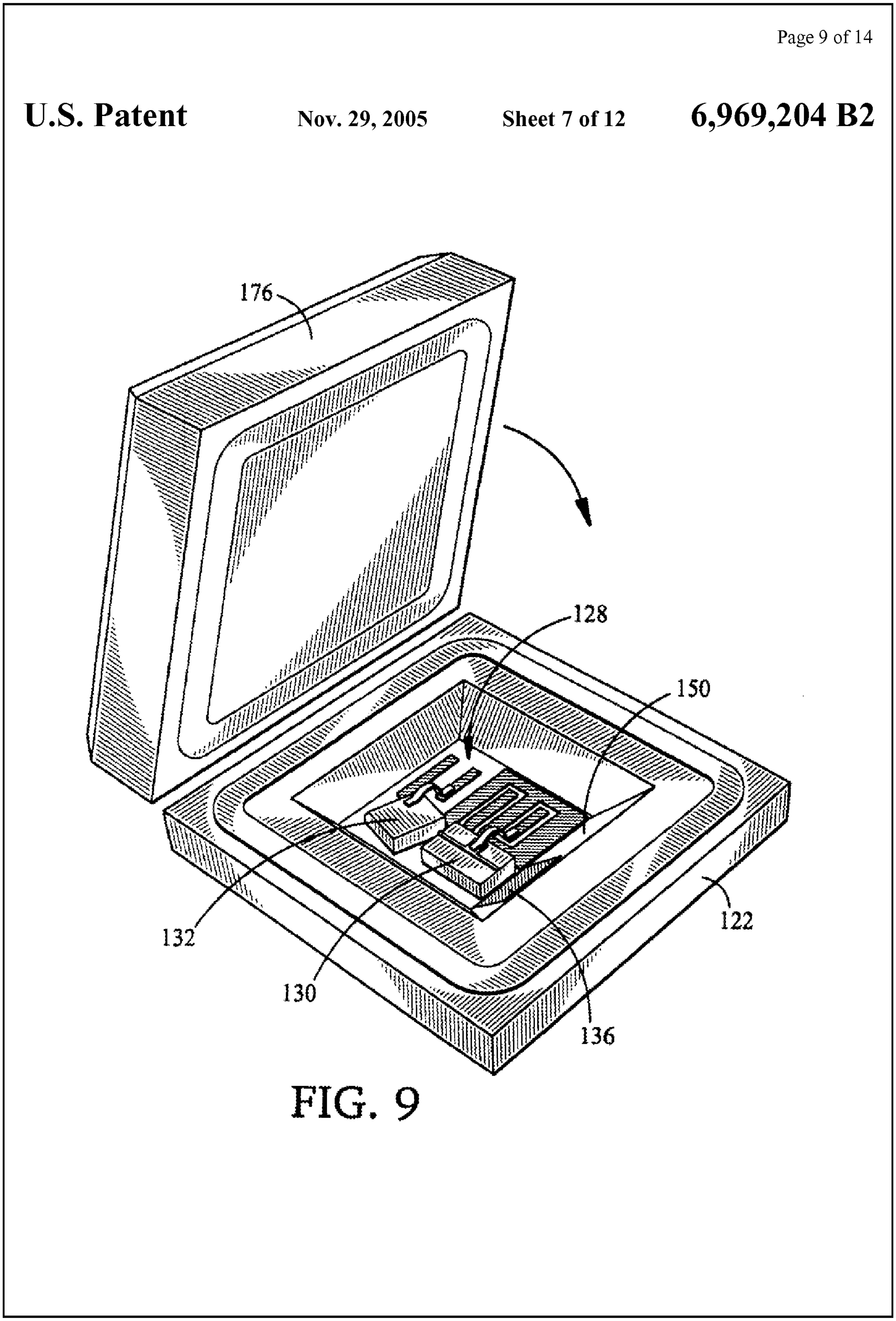
Figure 10:
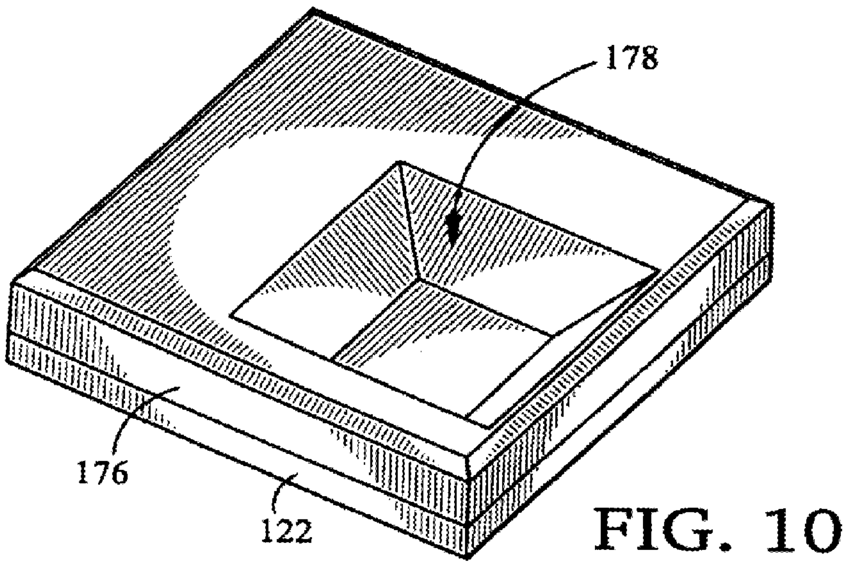
Figure 11:
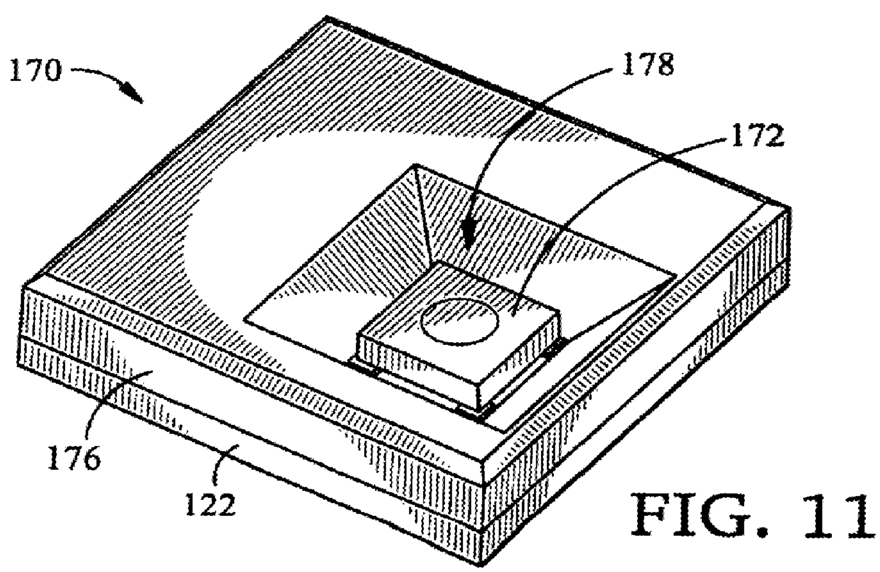
Figure 12:
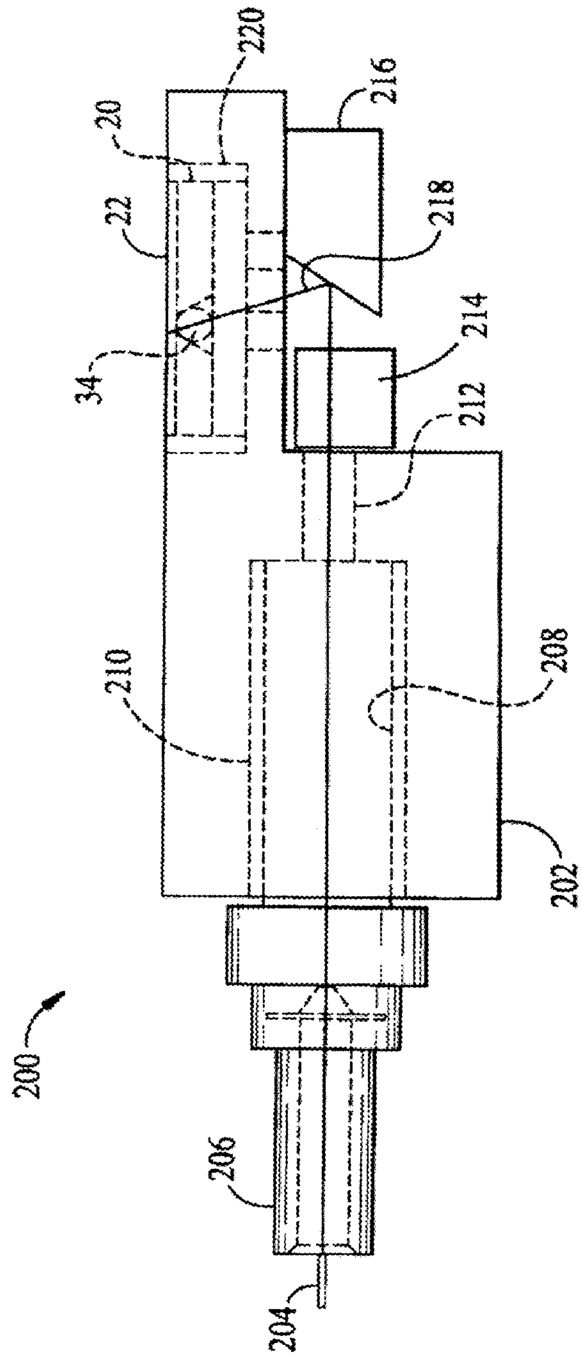
Figure 13:
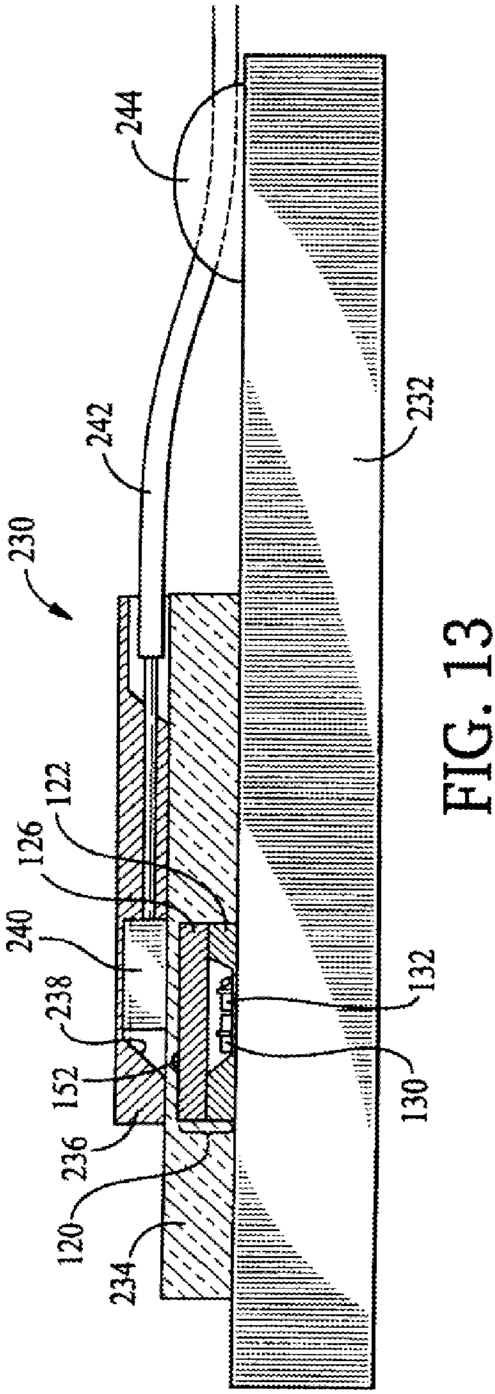
Figure 14:
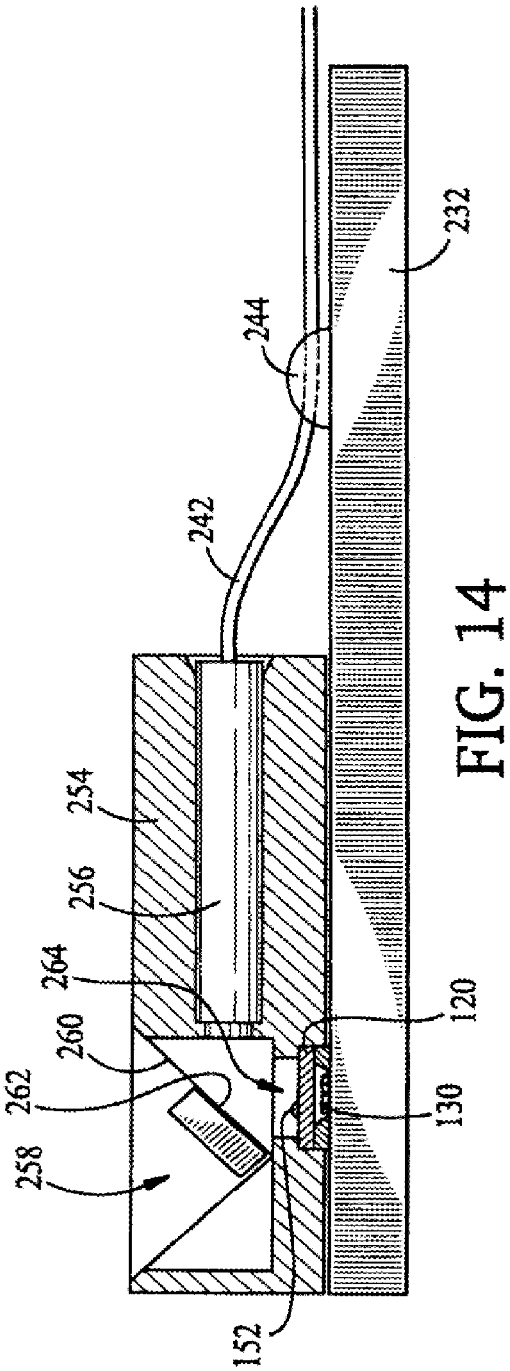
Figure 15:
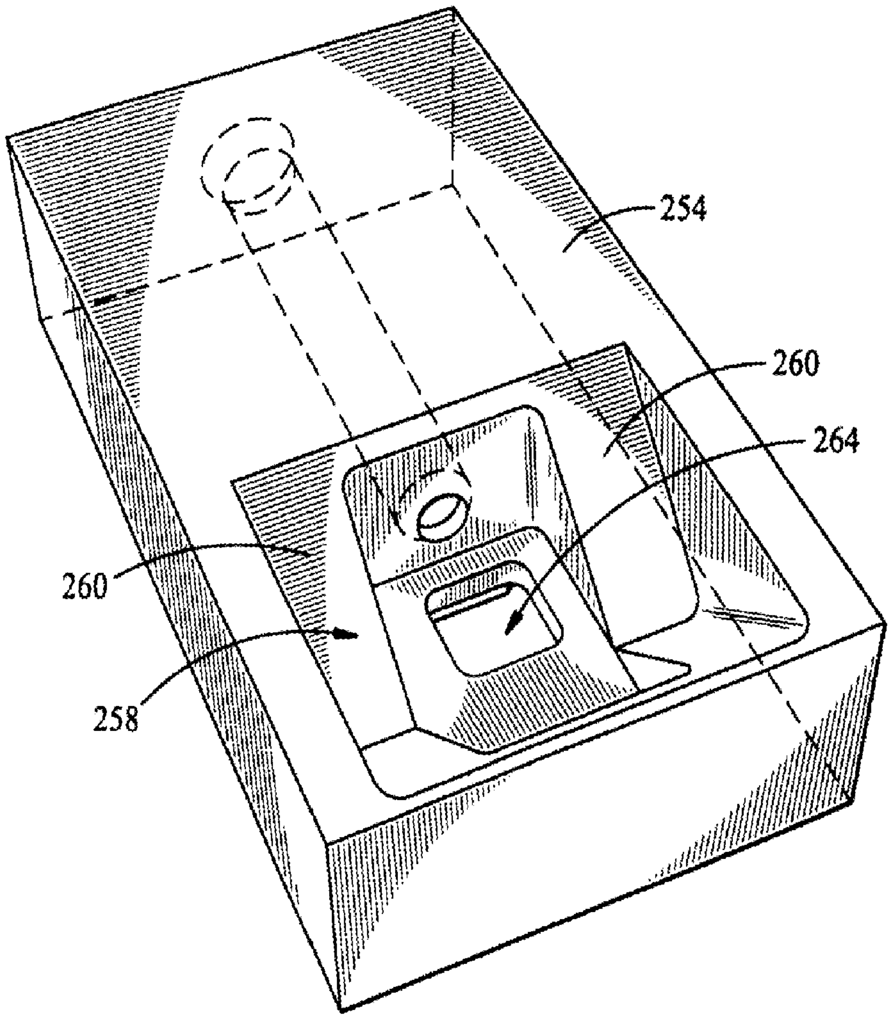
Figure 16:
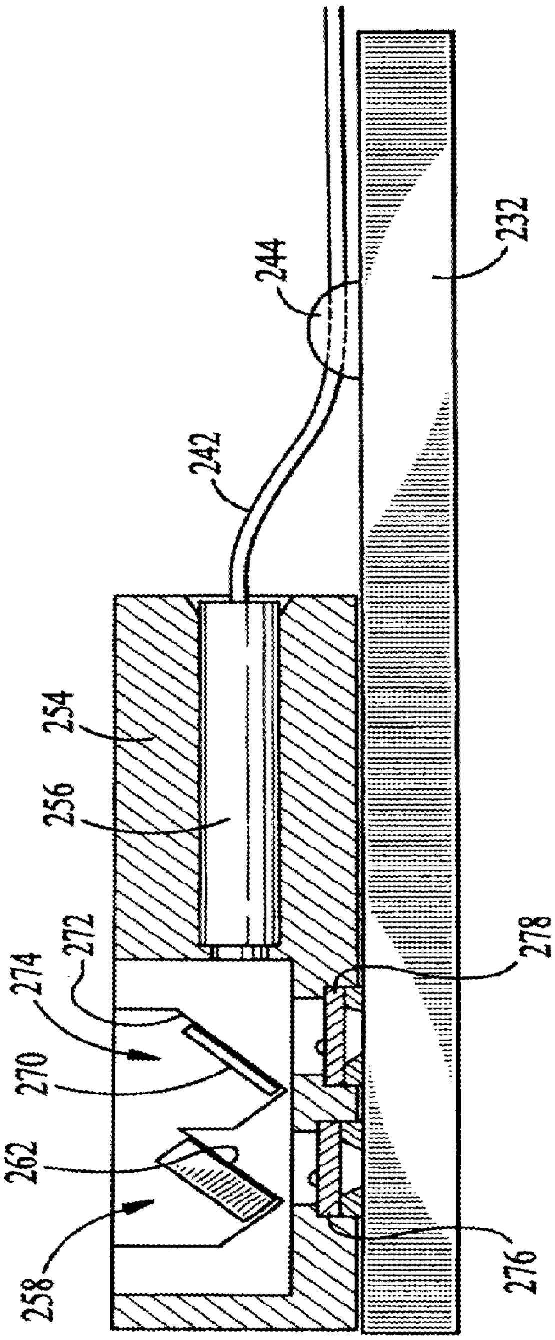

FIG. 16 illustrates an assembly that houses multiple packages, one 278 of which encapsulates a light emitting device and the other 276 of which encapsulates a light receiving device. Any of the optical package designs discussed above may be used for the packages 276, 278. In the illustrated implementation, the light emitting package 278 is based on the design of FIG. 4, whereas the light receiving package 276 is based, on the design of FIG. 8 except that it includes a light receiving device instead of the light emitting device 162.

The assembly of FIG. 16 includes a mirror with a reflecting surface 262 positioned against the slanted walls 260 of a first cut-out recess area 258. The assembly also includes a filter plate 270 positioned against walls 272 of a second cut-out recess area 274. The mirror and the filter plate both may be oriented at an angle of about 45°. The filter plate may be implemented, for example, as wavelength-sensitive beam splitter.

A light beam with a first wavelength may be emitted from the package 278. The light beam is reflected by the filter plate 270 and redirected through collimator assembly 256 into the fiber 242. On the other hand, a light beam having a second wavelength may be provided from the fiber. That light beam passes through the filter plate 270 and is reflected by the surface 262 of the mirror toward the package 276. The light receiving device in the package 276 would detect the received light beam.

Other implementations are within the scope of the claims.

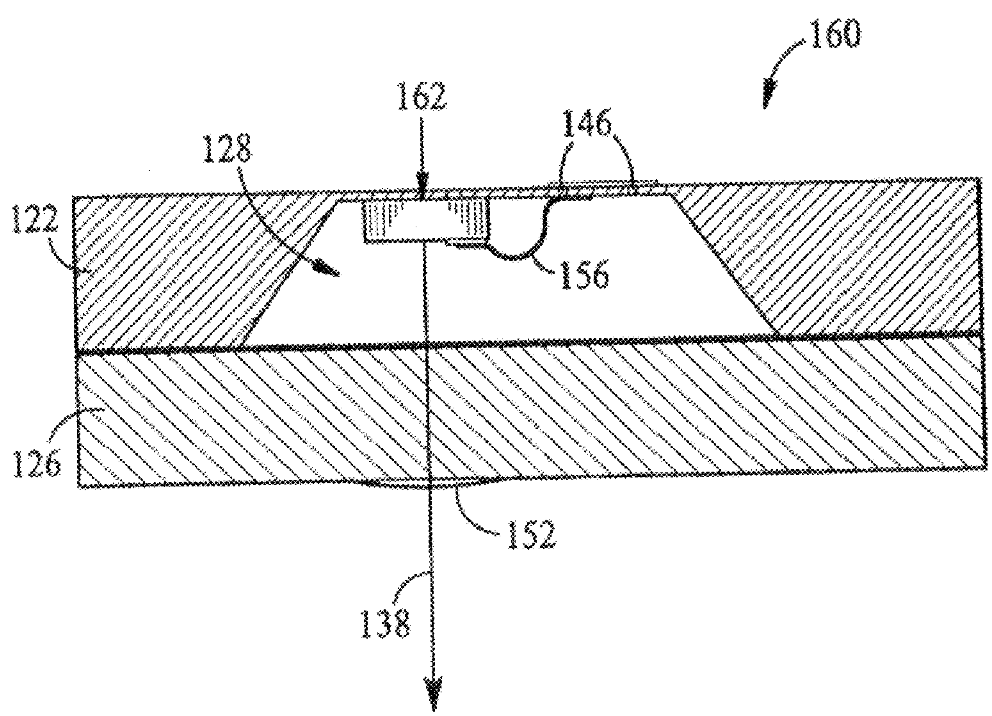

What is claimed is:

1. A package comprising:

a cap including a recess;

an opto-electronic device for emitting or receiving light, wherein the opto-electronic device is mounted within the recess;

hermetically-sealing feed-through metallization extending through the cap to couple the opto-electronic device to an electrical contact on an external surface of the cap;

a base attached to the cap to define an encapsulated region in the recess, wherein the base is transparent to a wavelength of light which the opto-electronic device is designed to emit or receive; and a lens integrated with the base for at least partially collimating a light beam to or from the opto-electronic device.

2. The package of claim 1 wherein the lens comprises a surface-machined micro-lens formed integrally with the base.

3. The package of claim 1 wherein the lens comprises a spherical protrusion from the base.

4. The package of claim 1 wherein the opto-electronic device includes a surface emitting semiconductor laser.

5. The package of claim 1 wherein the opto-electronic device includes an edge emitting semiconductor laser.

6. The package of claim 5 wherein the recess includes a sidewall with a reflective surface to redirect light from the opto-electronic device toward the lens.

7. The package of claim 6 wherein the reflecting coating comprises a metal.

8. The package of claim 6 wherein the sidewall is slanted to redirect the light at about a ninety degree angle.

9. The package of claim 1 wherein the opto-electronic device includes a light emitting device, and wherein light emitted by the opto-electronic device passes through the base and the lens to exit the package.

10. The package of claim 1 wherein the recess includes a sidewall with a reflective surface to redirect a light beam to or from the opto-electronic device.

11. The package of claim 1 wherein the opto-electronic device is hermetically sealed within the package.

12. The package of claim 11 wherein the cap includes an electrical contact in the recess and a through-hole to provide an electrical connection from the electrical contact in the recess to an electrical contact on an outer surface of the cap, and wherein the opto-electronic device is electrically coupled to the contact in the recess.

13. The package of claim 1 wherein the base includes a recess in an exterior surface, and wherein the lens is mounted within the recess of the base.

14. A package comprising:

a cap including a recess and an electrical contact in the recess, the cap including a through-hole with metallization to provide an electrical connection from the electrical contact in the recess to an electrical contact on an outer surface of the cap;

an opto-electronic device for emitting or receiving light, wherein the opto-electronic device is hermetically sealed within the package, is mounted within the recess, and is electrically coupled to the contact in the recess;

a base that is transparent to a wavelength of light which the opto-electronic device is designed to emit or receive; and a plate disposed between the cap and the base, the plate holding a lens for at least partially collimating a light beam;

wherein the recess includes a sidewall with a reflective surface to redirect a light beam between the opto-electronic device and the lens.

15. The package of claim 14 wherein the plate includes a pyramid-shaped groove to hold the lens.

16. The package of claim 14 wherein the lens includes a ball lens.

17. The package of claim 14 wherein the opto-electronic device includes an edge emitting semiconductor laser.

18. The package of claim 17 wherein the reflective coating is disposed to redirect light from the opto-electronic device toward the lens.

19. The package of claim 18 wherein the redirected light passes through the lens to exit the package through the base.

20. The package of claim 14 wherein the reflecting coating comprises a metal.

21. The package of claim 14 wherein the sidewall forms an angle to redirect the light at less than a ninety degree angle.

22. An assembly comprising:

(i) a package as recited in claim 1;

(ii) an optical fiber to transmit or receive an optical signal to or from the opto-electronic device; and (iii) an optical component disposed in a path for the optical signal between the opto-electronic device and the optical fiber, wherein the path of the optical signal passes through the lens.

23. The assembly of claim 22 wherein the optical component comprises an optical isolator.

24. The assembly of claim 22 wherein the optical component comprises an optical collimator.

25. The assembly of claim 22 wherein the optical component comprises a beamsplitter.

26. The assembly of claim 22 comprising:

a housing including:

(i) a recess in which the package is located; and (ii) a connector-receptacle to hold the optical fiber; and a mirror attached to the housing and oriented to redirect the optical signal between the opto-electronic device and the optical fiber.

27. The assembly of claim 22 comprising:

a housing including a recess in which the package is located; and a plate attached to the housing, and wherein the plate includes a groove with a reflective surface oriented to redirect the optical signal between the opto-electronic device and the optical fiber.

28. The assembly of claim 27 wherein the optical fiber is coupled to the plate in a pigtail design.

29. The assembly of claim 22 comprising:

a housing including a first recess in which the package is located and a second recess in which a mirror with a reflective surface is located and wherein the mirror is oriented to redirect the optical signal between the opto-electronic device and the optical fiber.

30. The assembly of claim 29 wherein the optical fiber is coupled to the housing in a pigtail design.

31. An assembly comprising:

(i) a first package as recited in claim 1;

(ii) a second package as recited in claim 1;

(iii) an optical fiber to transmit or receive optical signals to or from the opto-electronic devices;

(iv) a mirror with a reflective surface;

(v) a wavelength-dependent beamsplitter; and (iv) a housing to hold the first and second packages, the mirror and the beamsplitter, wherein an optical signal of a first wavelength is redirected by the beamsplitter to travel between the first package and the optical fiber, and wherein an optical signal of a second wavelength passes through the beamsplitter and is redirected by the mirror to travel between the second package and the optical fiber.

32. The assembly of claim 31 wherein the opto-electronic device in one of the first and second packages is a light emitting device, and wherein the opto-electronic device in the other one of the first and second packages is a light receiving device.

33. The assembly of claim 31 including a collimator assembly coupled to the optical fiber.

34. The assembly of claim 31 wherein the optical fiber is coupled to the housing in a pigtail design.

35. The package of claim 1 wherein the feed-through metallization extends through a surface of the cap on which the opto-electronic device is mounted.

* * * * *

UNITED STATES PATENT AND TRADEMARK OFFICE

CERTIFICATE OF CORRECTION

PATENT NO. : 6,969,204 B2
APPLICATION NO. : 10/305255
DATED : November 29, 2005
INVENTOR(S) : Arnd Kilian It is certified that error appears in the above-identified patent and that said Letters Patent is hereby corrected as shown below:

Delete old drawing sheets 1-12 and substitute the drawings with the attached 1-12 sheets of formal drawings.

Signed and Sealed this

Sixteenth Day of December, 2008

JON W. DUDAS
*Director of the United States Patent and Trademark Office*

UNITED STATES PATENT AND TRADEMARK OFFICE

CERTIFICATE OF CORRECTION

PATENT NO. : 6,969,204 B2
APPLICATION NO. : 10/305255
DATED : November 29, 2005

INVENTOR(S) : Arnd Kilian

It is certified that error appears in the above-identified patent and that said Letters Patent is hereby corrected as shown below:

Delete the Title page and substitute therefor the attached title page.

Delete old drawing sheets 1-12 and substitute the drawings with the attached 1-12 sheets of formal drawings.

This certificate supersedes the Certificate of Correction issued December 16, 2008.

Signed and Sealed this

Twentieth Day of January, 2009

JON W. DUDAS
*Director of the United States Patent and Trademark Office*

(12) United States Patent
Kilian

(10) Patent No.: US 6,969,204 B2
(45) Date of Patent: Nov. 29, 2005

(54) OPTICAL PACKAGE WITH AN INTEGRATED LENS AND OPTICAL ASSEMBLIES INCORPORATING THE PACKAGE

(75) Inventor: Arnd Kilian, Berlin (DE)

(73) Assignee: Hymite A/S, Lyngby (DK)

(*) Notice: Subject to any disclaimer, the term of this patent is extended or adjusted under 35 U.S.C. 154(b) by 138 days.

(21) Appl. No.: 10/305,255

(22) Filed: Nov. 26, 2002

(65) Prior Publication Data

US 2004/0101259 A1 May 27, 2004

(51) Int. Cl.[7] .......... G02B 6/42
(52) U.S. Cl. .......... 385/93; 385/88; 385/92; 385/94
(58) Field of Search .......... 385/88–94

(56) References Cited

U.S. PATENT DOCUMENTS 4,826,272 A * 5/1989 Pimpinella et al. .......... 385/92
4,897,711 A * 1/1990 Blonder et al. .......... 257/48
5,127,075 A 6/1992 Althaus et al.
5,577,142 A * 11/1996 Mueller-Fiedler et al. .... 385/47
5,696,862 A 12/1997 Hauer et al.
5,814,870 A 9/1998 Spaeth .......... 257/433
5,821,530 A * 10/1998 Lefevre et al. .......... 250/227.24
6,036,872 A 3/2000 Wood et al.
6,208,783 B1 * 3/2001 Wach .......... 385/43
6,422,766 B1 7/2002 Althaus et al.
6,547,455 B1 * 4/2003 Hashizume .......... 385/93
6,550,982 B2 * 4/2003 Auburger et al. .......... 385/88
2003/0071283 A1 4/2003 Heschel
2003/0152336 A1 * 8/2003 Gurevich et al. .......... 385/88

FOREIGN PATENT DOCUMENTS

DE 19616969 A1 10/1997
EP 0 331 331 A2 9/1989
EP 0 599 212 A1 6/1994
GB 2312551 A 10/1997
WO WO 96/00920 1/1996
WO 97/04491 2/1997
WO 01/01497 1/2001

* cited by examiner

*Primary Examiner*—Akm Enayet Ullah
*Assistant Examiner*—Kevin S. Wood
(74) *Attorney, Agent, or Firm*—Fish & Richardson P.C.

(57) ABSTRACT

Packages that include an integrated lens to help collimate light emitted by or to be received by an optoelectronic device encapsulated within the package are disclosed. The packages may be incorporated into larger optical assemblies.

35 Claims, 12 Drawing Sheets